United States Patent
Agnew

(10) Patent No.: US 10,483,573 B2
(45) Date of Patent: Nov. 19, 2019

(54) FUEL CELL UNIT FOR USE IN AGGREGATING MULTIPLE FUEL CELLS IN PARALLEL

(71) Applicant: LG FUEL CELL SYSTEMS INC., North Canton, OH (US)

(72) Inventor: Gerard D. Agnew, Derby (GB)

(73) Assignee: LG FUEL CELL SYSTEMS INC., North Canton, OH (US)

( * ) Notice: Subject to any disclaimer, the term of this patent is extended or adjusted under 35 U.S.C. 154(b) by 673 days.

(21) Appl. No.: 14/914,982

(22) PCT Filed: Sep. 4, 2014

(86) PCT No.: PCT/GB2014/052687
§ 371 (c)(1),
(2) Date: Feb. 26, 2016

(87) PCT Pub. No.: WO2015/033148
PCT Pub. Date: Mar. 12, 2015

(65) Prior Publication Data
US 2016/0211538 A1 Jul. 21, 2016

(30) Foreign Application Priority Data
Sep. 4, 2013 (GB) .................................. 1315754.0

(51) Int. Cl.
*H01M 8/04* (2016.01)
*H01M 8/04858* (2016.01)
(Continued)

(52) U.S. Cl.
CPC ..... *H01M 8/04888* (2013.01); *H01M 8/0438* (2013.01); *H01M 8/04365* (2013.01);
(Continued)

(58) Field of Classification Search
CPC ......... H01M 8/04888; H01M 8/04365; H01M 8/0438; H01M 8/04388; H01M 8/249;
(Continued)

(56) References Cited

U.S. PATENT DOCUMENTS

2007/0070654 A1 3/2007 Liu et al.
2008/0081236 A1 4/2008 Kanashiki
(Continued)

FOREIGN PATENT DOCUMENTS

WO 2014079994 A2 5/2014

OTHER PUBLICATIONS

Search Report from counterpart Great Britain Aplication No. 1315754. 0, dated Feb. 28, 2014, 4 pp.
(Continued)

*Primary Examiner* — Emily P Pham
(74) *Attorney, Agent, or Firm* — Dentons US LLP

(57) ABSTRACT

This invention relates to fuel cell unit for use in aggregating fuel cells, particularly useful for use when fuel cells are connected in parallel. Improving the management of fuel cell outputs across a plurality of aggregated fuel cells improves efficiency of the fuel cells. The invention relates to a fuel cell unit comprising a fuel cell and a regulating voltage converter, and further relates to a fuel cell module comprising a plurality of fuel cell units connected in parallel.

18 Claims, 18 Drawing Sheets

(51) Int. Cl.
- *H02M 3/155* (2006.01)
- *H02J 1/10* (2006.01)
- *H01M 8/249* (2016.01)
- *H01M 8/0432* (2016.01)
- *H01M 8/0438* (2016.01)
- *H02M 3/00* (2006.01)
- *H02J 1/00* (2006.01)
- *H02M 1/00* (2006.01)

(52) U.S. Cl.
CPC ....... *H01M 8/04388* (2013.01); *H01M 8/249* (2013.01); *H02J 1/10* (2013.01); *H02M 3/00* (2013.01); *H02M 3/155* (2013.01); *H02J 2001/004* (2013.01); *H02M 2001/0093* (2013.01)

(58) Field of Classification Search
CPC ................... H02M 3/00; H02M 3/155; H02M 2001/0093; H02J 1/10; H02J 2001/004
See application file for complete search history.

(56) References Cited

U.S. PATENT DOCUMENTS

| | | |
|---|---|---|
| 2008/0182143 A1 | 7/2008 | Dong et al. |
| 2008/0280175 A1* | 11/2008 | Gurunathan ............ H02M 1/14 429/405 |
| 2009/0029211 A1* | 1/2009 | Dong .................. H01M 8/0488 429/431 |
| 2010/0009220 A1 | 1/2010 | Higdon |
| 2012/0274145 A1 | 11/2012 | Taddeo |
| 2015/0055387 A1* | 2/2015 | Tengner ................. H02M 1/15 363/132 |

OTHER PUBLICATIONS

International Search Report and Written Opinion for corresponding PCT Application No. PCT/GB2014/052687, dated Nov. 13, 2014 (14 pgs.).

* cited by examiner

FUEL CELL UNIT FOR USE IN AGGREGATING MULTIPLE FUEL CELLS IN PARALLEL

This application is a national stage application under 35 U.S.C. § 371 of PCT Application No. PCT/GB2014/052687, filed Sep. 4, 2014, which claims the benefit of Great Britain Application No. 1315754.0, filed Sep. 4, 2013. The entire contents of each of PCT Application No. PCT/GB2014/052687 and Great Britain Application No. 1315754.0 are incorporated herein by reference in their entirety.

This invention relates to a device for managing fuel cell currents for use in aggregating fuel cells. In particular, this invention relates to a device for managing fuel cell currents when fuel cells are connected in parallel.

In the past few decades, the realisation of diminishing global energy sources has driven an interest in identifying highly electrically efficient energy solutions while also minimising the environmental impact from the use of fossil fuels through the release of harmful emission gases. Fuel cells provide such a promising power generation means, having an electrical efficiency of at least 50%. Fuel cells do not emit harmful polluting gases making them more environmentally friendly when compared with heat engines. Fuel cells consist of an anode, cathode and an electrolyte that allows ionic charge to flow between the anode and the cathode, while electrons are forced to take an external electrical path and thus provide an electric supply. Fuel cells are generally classified by the type of electrolyte used, for example, solid oxide (SOFCs), alkaline (AFCs), phosphoric acid (PAFCs), proton exchange membrane (PEMFCs) and molten carbonate (MCFCs), or by their operating temperature. SOFCs, for example, have operating temperatures of around 700° C. to 1000° C. Temperature variation may occur across a fuel cell, and can have negative consequences for fuel cell lifespan while also having positive effects such as improving fuel cell efficiency. Fuel cell design therefore, relies heavily on compromise of competing factors to achieve good fuel cell efficiency and lifespan.

A fuel cell converts chemical energy from a fuel i.e. the reactant, into electricity through a chemical reaction with oxygen or another oxidizing agent i.e. oxidant. Hydrogen is the most common fuel, but hydrocarbons such as natural gas and alcohols like methanol may also be used. A constant reactant stream and a constant oxidant stream are supplied to the fuel cell to sustain the chemical reaction and the generation of electricity. The fuel cell can produce electricity continually for as long as these inputs are supplied.

There is a drive to scale up fuel cells in order to deliver more and more power, particularly for stationary power plant applications. Desired outputs for domestic and stationary power applications are of the order of 800 W to a few megawatts. In order to deliver large power outputs, individual fuel cells are aggregated together, by connecting them together in series and/or in parallel. Therefore a fuel cell element may comprise a number of individual fuel cells connected together in series. A number of those fuel cell elements may be aggregated together to form a more powerful fuel cell element, and those increased power fuel cell elements may again be aggregated to form another fuel cell element. The manner of aggregation will depend on the output required and will also be affected by the fuelling and coolant requirements. Throughout the specification, the term fuel cell may refer to an individual fuel cell or a fuel cell element representing some level of aggregation. In particular, a fuel cell module refers to a number of fuel cell units connected together in parallel, where a fuel cell unit is an aggregated fuel cell element.

Over the lifetime of a fuel cell module comprising a number of fuel cell units connected in parallel, each fuel cell unit can experience varying degradation. This is caused by variations in temperature throughout the fuel cell module, in turn due to ageing and accumulated differences in area specific resistance (ASR) within the fuel cell units. The ASR of a fuel cell is the fuel cell's resistance normalized by the area of the fuel cell. The ASR is a more useful measurement than the resistance of a fuel cell because fuel cells are compared on a per-area basis. Ohmic voltage losses can be identified by multiplying a current density with the ASR.

The ASR of each smaller fuel cell element typically increases over its lifetime while the open circuit voltage profile across the fuel cell module tracks with temperature, and often the fuel cell is operated so that the temperature profile remains constant. Therefore, the current across each fuel cell unit may be very different near or at the End Of Life (EOL) of each fuel cell unit with current often varying between fuel cell units within the fuel cell module reflecting local variations in the balance between voltage variations driven by accumulated degradation and temperature.

Furthermore, manufacturing differences in individual fuel cell units may also contribute to differences in the current across each fuel cell unit. One particular fuel cell unit may suffer complete failure and therefore require replacing. Currently, replacing a defective fuel cell unit with a new fuel cell unit may cause an imbalance between the current across the fuel cell module and the fuel supplied thereto since the older fuel cell units will have experienced some degradation, and thus a reduction in the efficiency of the fuel cell module as a whole is expected.

Fuel cell unit replacement later in the life of a fuel cell module can result in the new fuel cell unit taking on a much greater current load, equivalent to that intended for several fuel cell units. In such situations, the fuel utilisation, which is the ratio of molar flow of fuel to the molar equivalent flow of current, may dramatically increase in the high current elements and fall below acceptable levels in the remaining fuel cell module.

Fuel utilisation is directly related to the efficiency of the fuel cell, and as such optimisation of the fuel utilisation is crucial. The local fuel cell module chemistry is a function of fuel utilisation. High fuel utilisation often results in a chemical regime that damages or degrades the fuel cell module. Therefore fuel utilisation must be raised to the maximum level that does not compromise fuel cell life. Often the acceptable range of the fuel utilisation ratio which must be delivered to obtain maximum efficiency without shortening fuel cell life, may be less than 5% and sometimes as little as 2%. The fuel flow that the current must match is essentially fixed and set by design features within the fuel cell that are fixed at manufacture.

Other problems with ripple currents for example may also contribute to current/power imbalance in a fuel cell module or direct damage to the fuel cell module if the ripple currents interfere with the chemistry of the fuel cell module.

U.S. Pat. No. 7,557,532 B2 discloses a system for stabilising the output voltage of a fuel cell by a DC-DC voltage converter for a fuel cell of a motorbike or other low power fuel cell. Typically, the output voltage of the fuel cell will dip when it goes on load, and U.S. Pat. No. 7,557,532 B2 aims to provide a solution to that issue. The total output voltage is compensated to a stable voltage by the DC-DC converter and a control circuit. The control circuit regulates the magnitude of the DC-DC voltage converter output voltage and monitors the total output voltage. However, this system does not address the problem associated with managing currents or voltages and loads across multiple fuel cells.

Accordingly the present invention seeks to provide a device for managing fuel cell currents and voltages for use in aggregating fuel cells, which reduces, preferably, overcomes the above mentioned problems.

BRIEF SUMMARY OF THE DISCLOSURE

In accordance with an aspect there is provided a fuel cell unit adapted to connect to a positive load rail and a negative load rail, suitable for being one of a number connected in parallel to the positive load rail and the negative load rail, the fuel cell unit comprising a fuel cell, having a fuel cell output voltage presented between a positive fuel cell output terminal and a negative fuel cell output terminal, and a regulating voltage converter having a DC converter output voltage presented across a positive converter output terminal and a negative converter output terminal and a converter input adapted to be driven;

the regulating voltage converter being arranged so that
the converter input is driven by the fuel cell output voltage in series with the converter output voltage; and
the converter output voltage combines with the fuel cell output voltage such that the voltage across the fuel cell and the regulating voltage converter is the same as the voltage across the positive load rail and negative load rail.

Optionally, the regulating voltage converter is a DC-DC converter.

Optionally, the regulating voltage converter is an AC-DC converter. Such an AC-DC converter may be driven by an interim ac voltage.

In accordance with another aspect there is provided a fuel cell unit adapted to connect to a positive load rail and a negative load rail, suitable for being one of a number connected in parallel to the positive load rail and the negative load rail, the fuel cell unit comprising a fuel cell, having a fuel cell output voltage presented between a positive fuel cell output terminal and a negative fuel cell output terminal, and a regulating DC-DC converter having a converter output voltage presented across a positive converter output terminal and a negative converter output terminal and a converter input adapted to be driven;

the regulating DC-DC converter being arranged so that
the converter input is driven by the fuel cell output voltage in series with the converter output voltage; and
the converter output voltage combines with the fuel cell output voltage such that the voltage across the fuel cell and the regulating DC-DC converter is the same as the voltage across the positive load rail and negative load rail.

Optionally, the positive fuel cell output terminal may be adapted to be connected to the positive load rail and the negative output converter terminal may be adapted to be connected to the negative load rail.

Optionally, the regulating DC-DC converter input may comprise a positive converter input terminal and a negative converter input terminal; and the negative converter output terminal may be further connected to the negative converter input terminal, the positive fuel cell output terminal may be further connected to the positive converter input terminal, and the negative fuel cell output terminal may be connected to the positive converter output terminal.

Optionally, the regulating DC-DC may be a boost converter.

Optionally, the regulating DC-DC may be a buck converter.

Optionally, the regulating DC-DC may be a flyback converter.

Optionally, the negative fuel cell output terminal may be adapted to be connected to the negative load rail and the positive converter output terminal may be adapted to be connected to the positive load rail.

Optionally, the DC-DC converter input may comprise a positive converter input terminal and a negative converter input terminal; and the positive converter output terminal may be further connected to the positive converter input terminal, the negative fuel cell output may be further connected to the negative converter input terminal, and the positive fuel cell output terminal may be connected to the negative converter output terminal Optionally, the flyback converter may be a hybrid rated flyback converter.

Optionally, the hybrid flyback converter may comprise a primary winding and a secondary winding, the primary winding being rated for one of fuel cell current or fuel cell voltage, the secondary winding being rated for fuel cell current.

Optionally, the regulating DC-DC converter may be driven by an interim voltage which may be provided by an intermediate converter, the intermediate converter being driven by the fuel cell output voltage in series with the converter output voltage, such that the regulating DC-DC converter may be driven indirectly by the fuel cell output voltage in series with the converter output voltage. Optionally the intermediate converter may be a step-down converter.

Optionally, the regulating DC-DC may be an inverting converter.

Optionally, the regulating voltage converter is an AC-DC converter driven by an interim AC voltage.

Optionally, the AC-DC converter comprises a rectifier.

Optionally, the interim AC voltage is derived from the fuel cell output voltage in series with the converter output voltage.

Optionally, the plurality of fuel cell units may be connected in parallel across the positive load rail and the negative load rail.

Optionally, the fuel cell unit may further comprise an intermediate converter adapted to provide an interim voltage wherein the intermediate converter may be driven by the voltage across the positive load rail and negative load rail, and the interim voltage drives the regulating DC-DC converters. Typically, the intermediate converter is a step-down converter.

In accordance with a further aspect, there is provided a fuel cell unit adapted to connect to a first load rail and a second load rail, suitable for being one of a number connected in parallel to the positive load rail and the negative load rail, the fuel cell unit comprising a fuel cell, having a fuel cell output voltage presented between a first fuel cell output terminal and a second fuel cell output terminal, and a regulating DC-DC converter having a converter output voltage presented across a first converter output terminal and a second converter output terminal and an input adapted to be driven comprising a first converter input terminal and a second converter input terminal;

wherein the first load rail is adapted to be connected to the second converter input terminal and the first converter output terminal, the second load rail is adapted to be connected to the second fuel cell output terminal, the first converter input terminal is connected to the first fuel cell output terminal, and the second converter output terminal is adapted to be connected to the second load rail.

According to a further aspect, there is provided a fuel cell module comprising a plurality of fuel cells units in which the plurality of fuel cell units are connected in parallel across the positive load rail and the negative load rail. Such a fuel cell module may be used to supply power to the grid, by way of a Grid Connected Inverter (GCI).

Optionally, the fuel cell module may further comprise an intermediate converter adapted to provide an interim voltage wherein the intermediate converter is driven by the voltage across the positive load rail and negative load rail, and the interim voltage drives the regulating voltage converters.

Optionally, the fuel cell module comprises a plurality of intermediate converters, each having a positive output terminal and a negative output terminal wherein each positive output terminal is connected to a diode such that the output of the diodes provide the interim voltage.

Optionally, the intermediate converter is an AC inverter providing an AC interim voltage and the regulating voltage converters are AC-DC converters.

Optionally, the intermediate converter is driven indirectly by the voltage across the positive load rail and negative load rail.

In accordance with a further aspect, there is provided a method of operating a fuel cell unit, the method comprising the steps of:
determining the molar flow of fuel in the fuel cell;
adjusting the regulating voltage converter so as to control the output current of the fuel cell unit, such that the fuel utilisation of the fuel cell is within a desired range.

Optionally, the step of determining the molar flow of fuel in the fuel cell may comprise determining the molar flow of fuel in the fuel cell from modelled data.

Optionally, the step of determining the molar flow of fuel in the fuel cell may comprise determining the molar flow of fuel in the fuel cell from contemporaneously measured data.

Optionally, a plurality of fuel cell units may be connected in parallel to form a fuel cell module, the method may comprising adjusting each regulating voltage converter independently.

In accordance with a further aspect, there is provided a method of operating a fuel cell unit, the method comprising the steps of:
determining the temperature in the fuel cell unit;
adjusting the converter output voltage so as to control the output current of the fuel cell unit, such that the fuel cell unit operates at or close to a limiting level of anode volatility.

Optionally, the step of determining the temperature in the fuel cell comprises determining the temperature in the fuel cell from modelled data or from contemporaneously measured data from a number of temperature sensors arranged in the fuel cell module.

Optionally, a plurality of fuel cell units are connected in parallel to form a fuel cell module, comprising adjusting each regulating DC-DC converter independently.

BRIEF DESCRIPTION OF THE DRAWINGS

Embodiments of the invention are further described hereinafter with reference to the accompanying drawings, in which.

DETAILED DESCRIPTION

In the described embodiments, like features have been identified with like numerals, albeit in some cases having increments of integer multiples of 100. For example, in different FIGS. 2, 302, and 502 have been used to indicate a fuel cell unit.

Fuel cells comprise an anode electrode, a cathode electrode and a reactant stream and an oxidant stream, and are arranged around two parallel surfaces of an elongate hollow member i.e. a fuel cell tube. The fuel cell tubes are porous to allow fuel to flow to the fuel cells. The fuel cells are spaced apart along the fuel cell tubes and are electrically connected in series. Fuel flows sequentially through the fuel cell tubes from a fuel inlet manifold to fuel outlet manifold. Additionally, air or oxidant flows through the space between adjacent fuel cell tubes.

Figure 1:
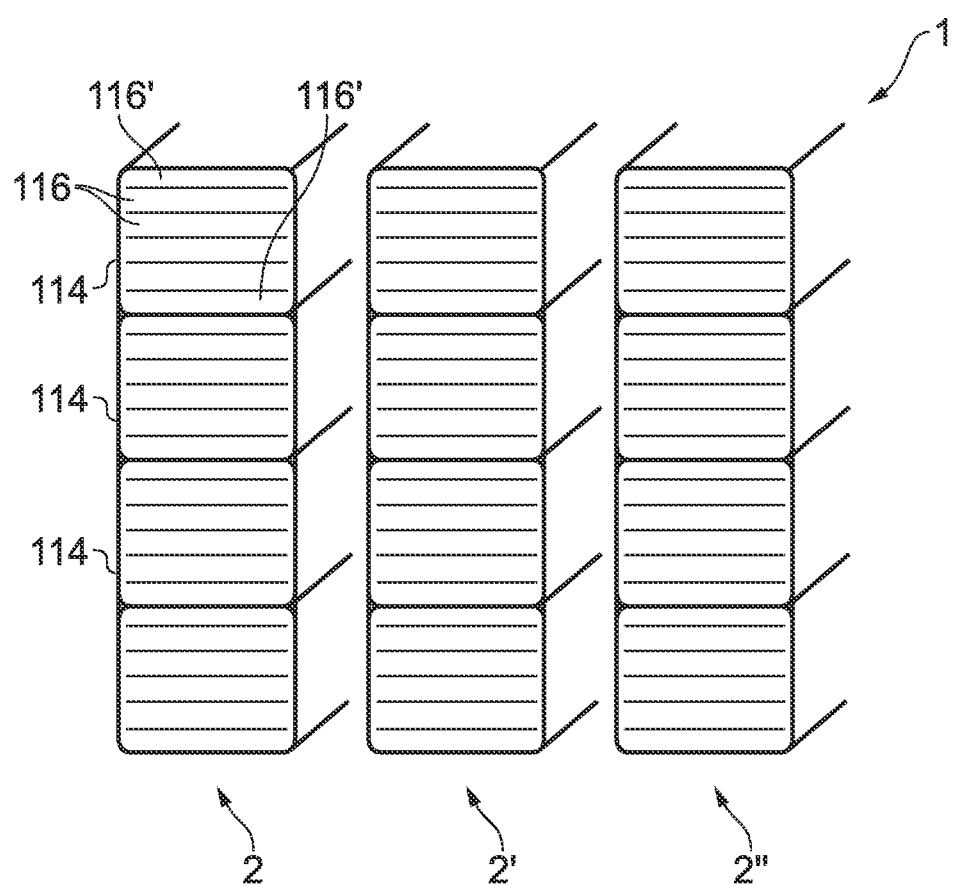
FIG. 1 shows a section of a fuel cell module.

A fuel cell module is an aggregated fuel cell element, made up of a plurality of fuel cell units 2. FIG. 1 shows a fuel cell module 100 of three fuel cell units 2, 2', 2". The fuel cell units 2 are made up of a plurality of smaller fuel cell elements, connected in series and/or parallel. Each fuel cell unit 2, 2', 2" may typically comprise a number of fuel cell tubes. In one embodiment, the fuel cell unit comprises two sets of six fuel cell tubes, where a fuel cell tube is a fuel cell element comprising a number of individual fuel cells connected in series, such that the fuel cell unit has 720 individual fuel cells electrically connected in series. In a preferred embodiment, a fuel cell module is formed from five fuel cell units connected together in parallel. Fuel and oxidant for a fuel cell module are regulated at fuel cell unit level, while the temperature is regulated at fuel cell module level.

Typically, a number of fuel cell units 2, 2', 2" are connected in parallel to form a fuel cell module 100, however it should be understood that the invention may be applied at other levels of aggregation within an aggregated fuel cell element, and the term fuel cell unit may be understood to refer to a variety of aggregated fuel cell elements.

A fuel cell module refers a plurality of fuel cell units connected together in parallel. A fuel cell power supply system refers to a plurality of fuel cell modules aggregated together to provide a useful industrial or domestic power supply.

Figure 2:
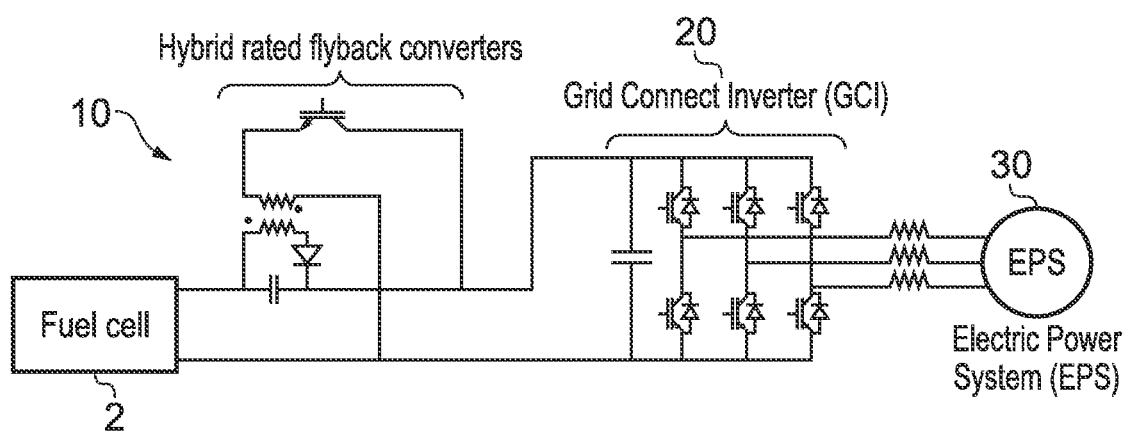
FIG. 2 is a circuit diagram of a fuel cell unit connected to a grid connect inverter.

FIG. 2 shows an embodiment of the fuel cell unit having a voltage regulation. A fuel cell unit 2 is connected to a regulating voltage converter, in this case a DC-DC converter 10. The DC-DC converter 10 shown is a flyback converter. The regulating DC-DC converter 10 is arranged so that the input is driven by the fuel cell output voltage in series with the converter output voltage; and the converter output voltage combines with the fuel cell output voltage such that the voltage across the fuel cell and the regulating DC-DC converter is the same as the voltage across the positive load rail and negative load rail. The fuel cell unit 2 and regulating DC-DC converter are connected to the grid connect inverter 20 (GCI) which feeds into an electric power system 30 (EPS).

A benefit of this arrangement is to control the different currents of each of a plurality of fuel cell units. Without control of the current of each of the plurality of fuel cell units, differences in area specific resistance (ASR) and open circuit voltage of each fuel cell unit may lead to differences in the current across each fuel cell unit 2. When a fuel mixture is fed to the fuel cell units the currents must be balanced but by not balancing the currents, fuel utilisation is not optimised and the fuel cell becomes inefficient.

The output voltage of the regulating DC-DC converter 10 is combined with the fuel cell fuel 2 output voltage such that the voltage across the fuel cell unit 2 and the regulating DC-DC converter 10 is the same as the voltage across a positive load rail and a negative load rail.

The presence of the flyback converter is useful in that it provides isolation to the fuel cell unit, thus facilitating the elimination of other specific isolation components.

Figure 3:
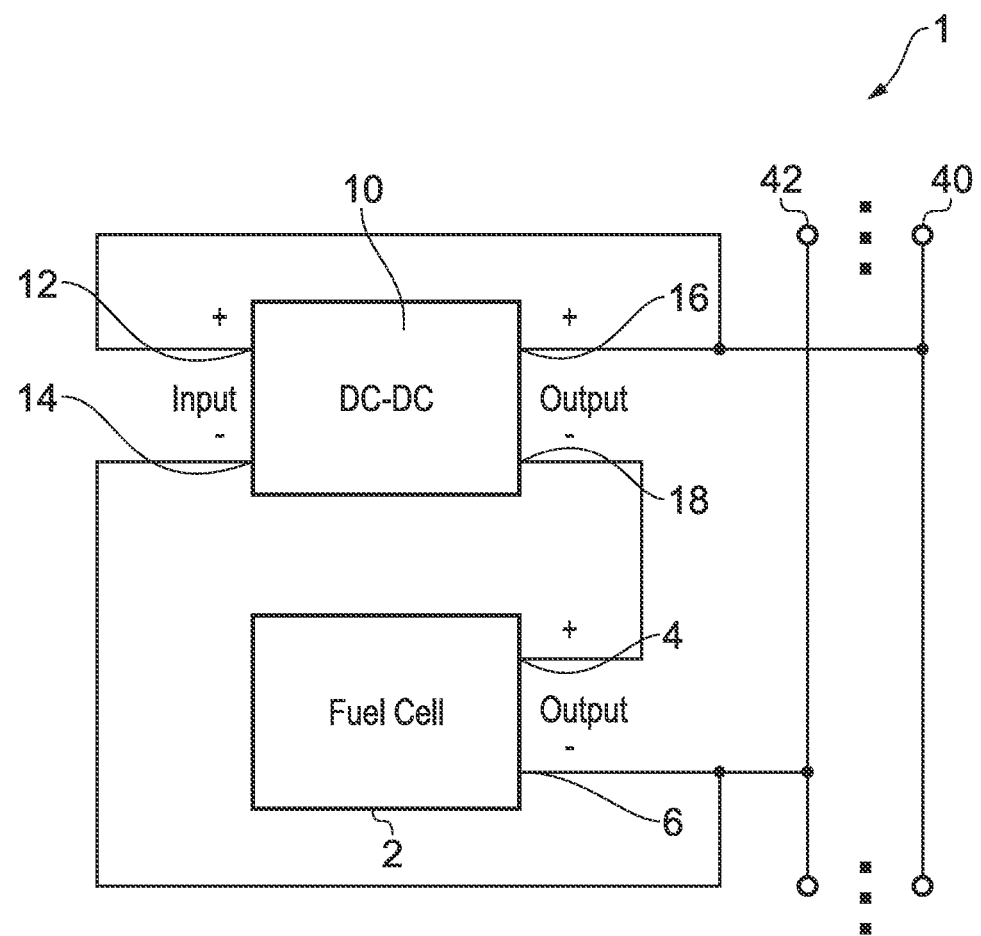
FIG. 3 is a block diagram of a fuel cell unit.

FIG. 3 shows fuel cell module 1. Only one fuel cell unit 2 is shown, but the person skilled in the art will appreciate that additional fuel cell units 2 may be added to the load rails 40, 42, each with its own corresponding regulating DC-DC converter 10. For example, several fuel cell units are connected in parallel to form a fuel cell module, as described above. Each fuel cell unit is adapted to connect to a positive load rail and a negative load rail, and is suitable for being one of a number of fuel cell units connected in parallel to the positive load rail and the negative load rail.

The fuel cell unit 2 has a fuel cell output voltage presented between a positive fuel cell output terminal 4 and a negative fuel cell output terminal 6. A regulating DC-DC converter has a converter output voltage presented across a positive converter output terminal 16 and a negative converter output terminal 18 and a converter input 12, 14 adapted to be driven. The regulating DC-DC converter is arranged so that the converter input 12, 14 is driven by the fuel cell output voltage in series with the converter output voltage. The converter output voltage 16, 18 is arranged to combine with the fuel cell output voltage 4, 6 such that the voltage across the fuel cell unit 2 and the regulating DC-DC converter 10 is the same as the voltage across the positive load rail 40 and negative load rail 42. The negative fuel cell output terminal 6 is connected to the negative load rail 42, and the a positive converter output terminal 16 is connected to positive load rail 40, and the positive fuel cell output terminal 4 is connected to the negative converter output terminal 18. In this way, the series combination of the fuel cell output voltage and converter output voltage is equal to the total load voltage.

The arrangement provides a fuel cell unit 2 able to balance current against fuel.

In this particular embodiment, the regulating DC-DC converters 10 are controlled by a controller (not shown) so that a current across each of the fuel cells can be set at a specific value. The benefit of regulating the current across each fuel cell unit is that the current can be matched to the fuel flowing through each of the fuel cell units. In this arrangement, the fuel cell unit voltage is corrected up by the electromotive force (emf) of the regulating DC-DC converter output. The regulating DC-DC converter 10 is in series with the fuel cell unit 2, and the regulating DC-DC converter 10 is driven by the fuel cell output voltage in series with the converter output voltage. The arrangement assists paralleling of fuel cell units and enables current to be balanced between a plurality of fuel cell units.

Figure 4:
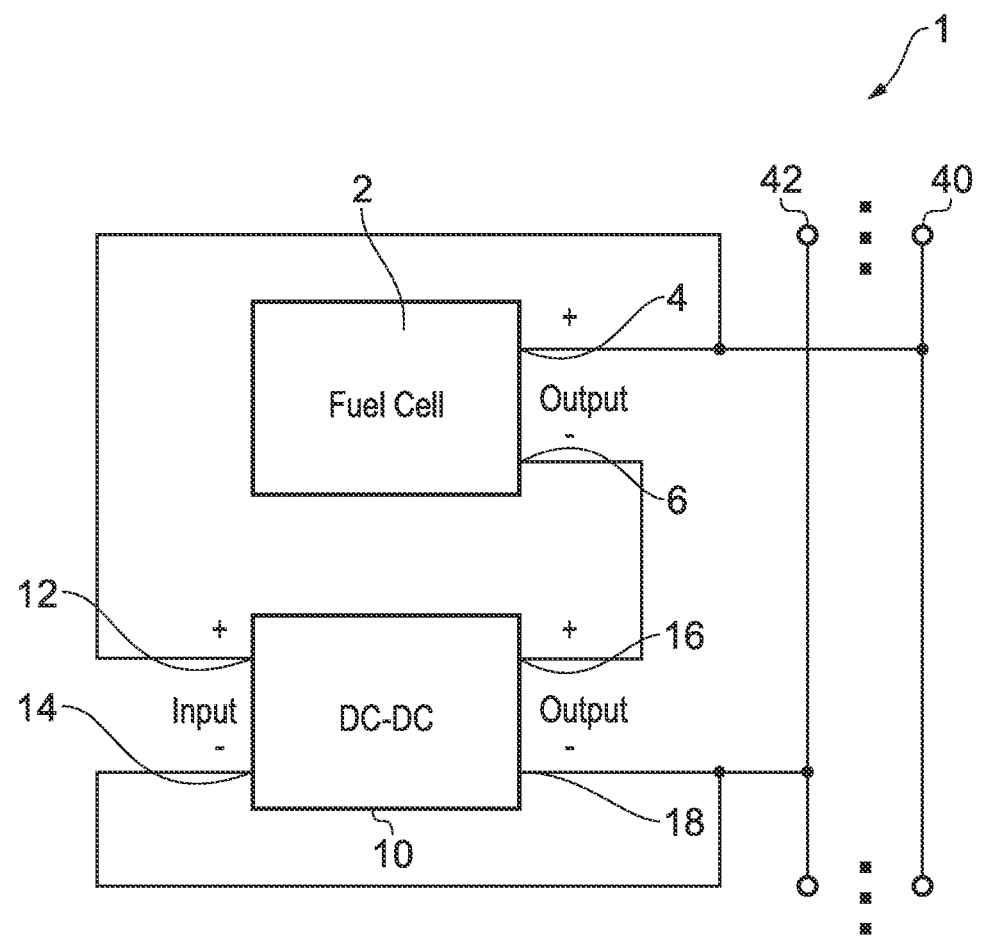
FIG. 4 is a block diagram of a fuel cell unit.

FIG. 4 shows an alternative arrangement to that described in FIG. 3. In this arrangement, the negative converter input terminal 14 and negative converter output terminal 18 are connected to the negative load terminal 42, and the positive fuel cell output terminal 4 is connected to the positive load terminal. In this arrangement, the fuel cell voltage is again corrected up by the emf of the DC-DC output such that the series combination of the fuel cell output voltage and converter output voltage is equal to the total load voltage.

Figure 5:
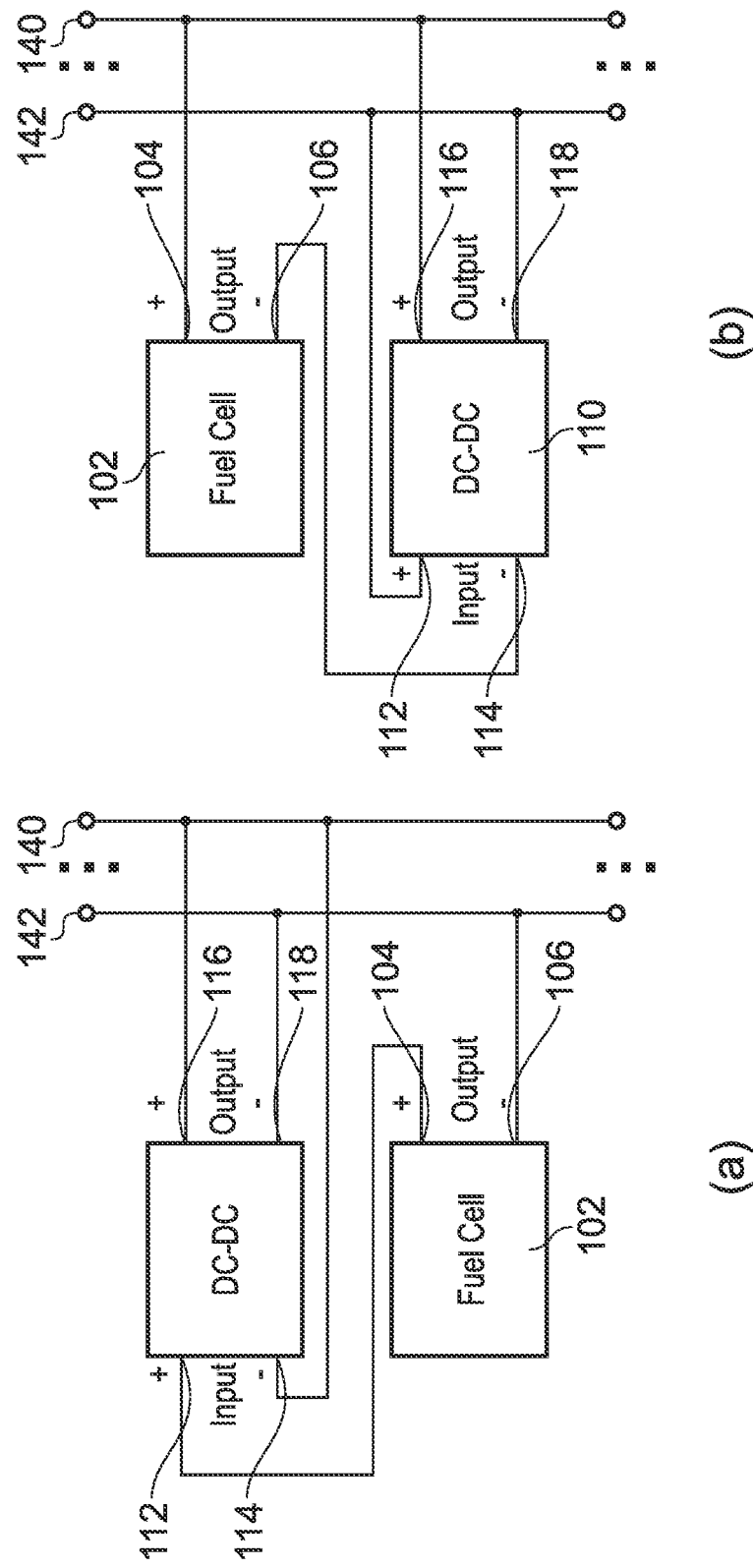
FIG. 5a and FIG. 5b are block diagrams of a fuel cell unit.

FIG. 5(*a*) and FIG. 5(*b*) show alternative arrangements. The difference between FIGS. 5(*a*) and 5(*b*) is the position of the fuel cell unit relative to the regulating DC-DC converter.

In FIG. 5(*a*), the negative converter output terminal 118 is connected to negative load rail 142 and the negative fuel cell output terminal 104 is connected to the negative load rail 142.

In FIG. 5(*b*), the positive converter output terminal 116 is connected to positive load rail 140 and the positive fuel cell output terminal 106 is connected to the positive load rail 140. In this embodiment, the regulating DC-DC converter output voltage 116, 118 combines with the output voltage 104, 106 of each of the plurality of fuel cell units 102 such that the voltage across each of the plurality of fuel cell units 102 and the regulating DC-DC converters 110 is the same as the voltage across the positive load rail 140 and the negative load rail 142. The regulating DC-DC converter 110 is in parallel with the overall corrected output and the regulating DC-DC converter 110 input is driven by the fuel cell output voltage in series with converter output voltage.

The benefit for the arrangements described above is that inexpensive components may be used to effectively hide some of the complex electric power characteristics of the fuel cell units such as compensating for any overall total voltage reduction typically induced by loading the fuel cell module.

Furthermore, isolating the fuel cell units from the grid connect power electronics provides benefits in terms of minimising exposure of the fuel cells to power switching harmonics. Typically, an inverter used to connect the fuel cell to the grid operates at around 3 kHz and have corresponding switching harmonics in the region of about 10 to 20 kHz. In certain circumstances, a ripple current of around 60 to 180 Hz, or more typically at around 120 Hz may occur. The AC impedance response of a fuel cell is not typically constant, and impedance effects exist which may be at the time scale of certain processes and occur in the low frequency range at around the frequency of the ripple and at the higher frequency range around the frequency of the harmonics. Therefore, isolating the fuel cells from the power electronics by implementing regulating DC-DC converters can reduce the effects of the ripple and switching harmonics of the grid connection inverters.

Figure 6:
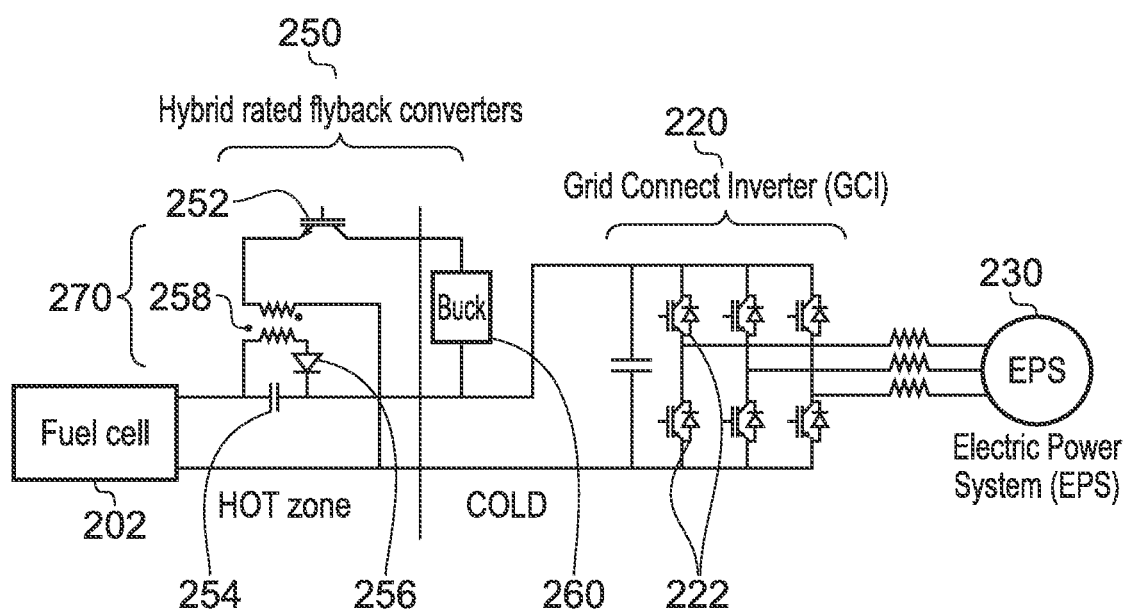
FIG. 6 is a circuit diagram of a fuel cell unit with an intermediate converter connected to a grid connect inverter.

FIG. 6 shows a modification of the circuit shown in FIG. 2, including a step down intermediate converter, in this case a buck converter 260 adapted to pre-condition the DC-DC converter input voltage. FIG. 6 also illustrates the use of inexpensive components, typically rated for temperatures up to 105° C., arranged to regulate the voltage of the fuel cell unit. Some of the latest SiC or GaN devices having higher switching frequencies have higher temperature capabilities but reduced voltage rating. The individual fuel cell unit circuits 270 may be devised using integrated devices able to operate at very high frequency with a very fast response and with low part counts. Components such as the capacitor 254, the diode 256, the inductors 258 and the transistor 252 of the flyback converter may also be able to cope with temperatures up to 105° C. and thus portions of the individual fuel cell unit circuits may be located closer to the high temperature fuel cell unit.

More expensive, more complex components such as the buck converter 260 and the grid connection inverters 222 are located further away from the fuel cell unit so they are not unduly affected by high temperatures of the fuel cell units.

In a particular example, a fuel cell unit fully loaded to around 584V may only require a relatively small uplift of 18V, i.e. only around 3.1% of the power flowing through the DC-DC converter. Even with a regulating DC-DC converter having an efficiency of around 90%, any losses are scaled down by the proportion of the power flowing through, and therefore the resulting drop in efficiency for the fuel cell unit would be around 0.3% for this stage of conversion. Inserting the buck converter as a fuel cell module level pre-conditioner to drop the 584V bus to 12 or 24V feed to the individual DC-DC converter could again use a simple 90% efficient buck and still only cost 0.3%. Such a pre-conditioning converter is not limited to a buck converter and may also be a flyback converter or the like.

In certain embodiments, the buck converter 260 upfront of the regulating DC-DC converter results in the regulating DC-DC converter handling smaller voltages. In this way, the DC-DC converter is being driven indirectly by the total load voltage, by way of the buck converter.

Figure 7:
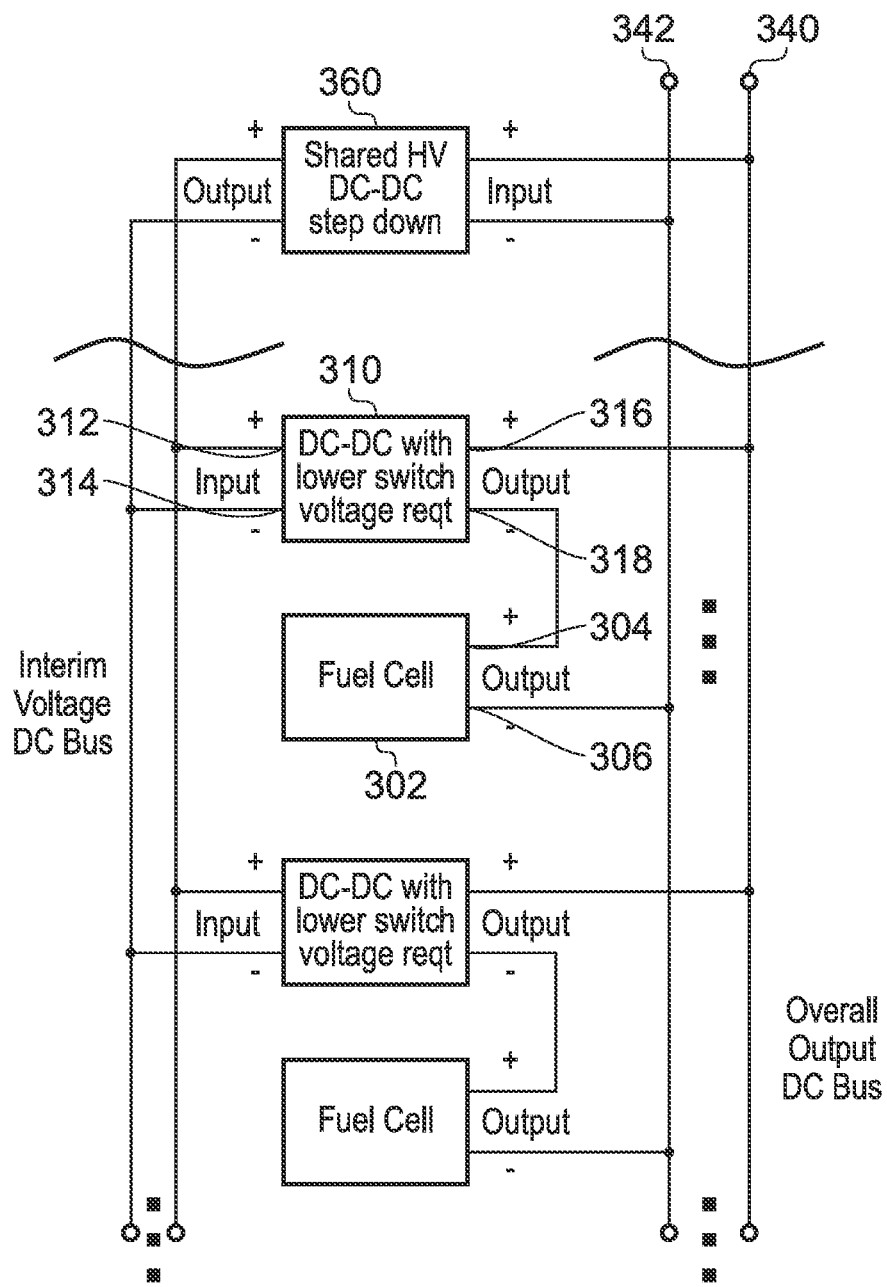
FIG. 7 is a block diagram of a fuel cell module having a shared DC-DC intermediate step down converter.

FIG. 7 shows a fuel cell module having a plurality of fuel cell units 302 each having a DC-DC converter 310. The fuel cell units are connected in parallel across the positive and negative load rails. This arrangement is referred to as a negative common rail arrangement, as the negative fuel cell output terminals are connected to the negative load rails. Each DC-DC converter is connected to a shared DC-DC high voltage step down converter 360. The step down intermediate converter 360 provides in interim voltage to supply the regulating DC-DC converters. As mentioned above in relation to FIG. 6, this allows pre-conditioning of the regulating DC-DC converters. As such, the plurality of regulating DC-DC converters 310 are driven indirectly by the voltage across the positive load rail 340 and the negative load rail 342 via a step-down intermediate DC-DC converter 360. The fuel cell units of the fuel cell module of FIG. 7 substantially correspond to that shown in FIG. 3, except that the regulating DC-DC converters are driven by the interim voltage provided by the step-down intermediate converter, instead of being driven directly.

The DC-DC shared high voltage step down intermediate converter 360 lowers the voltage for several fuel cell units 302. The shared reduced voltage enables individual regulating DC-DC converters to use fully integrated devices or the latest SiC or GaN devices with higher switching frequencies and higher temperature capabilities but reduced voltage rating.

Referring again to the example outlined in relation to FIG. 6, if a fuel cell unit fully loaded to around 584V only requires a relatively small uplift of 18V, i.e. only around 3.1% of the power flowing through the DC-DC converter, then with a regulating DC-DC converter having an efficiency of around 90%, any losses are scaled down by the proportion of the power flowing through, and therefore the resulting drop in efficiency for the fuel cell unit would be around 0.3% for this stage of conversion. However, inserting the shared DC-DC high voltage step down intermediate converter 360 to drop the 584V bus to 12V or 24V to feed to the individual regulating DC-DC converters, using a simple 90% efficient converter, would still only cost a 0.3% drop in efficiency.

Figure 8:
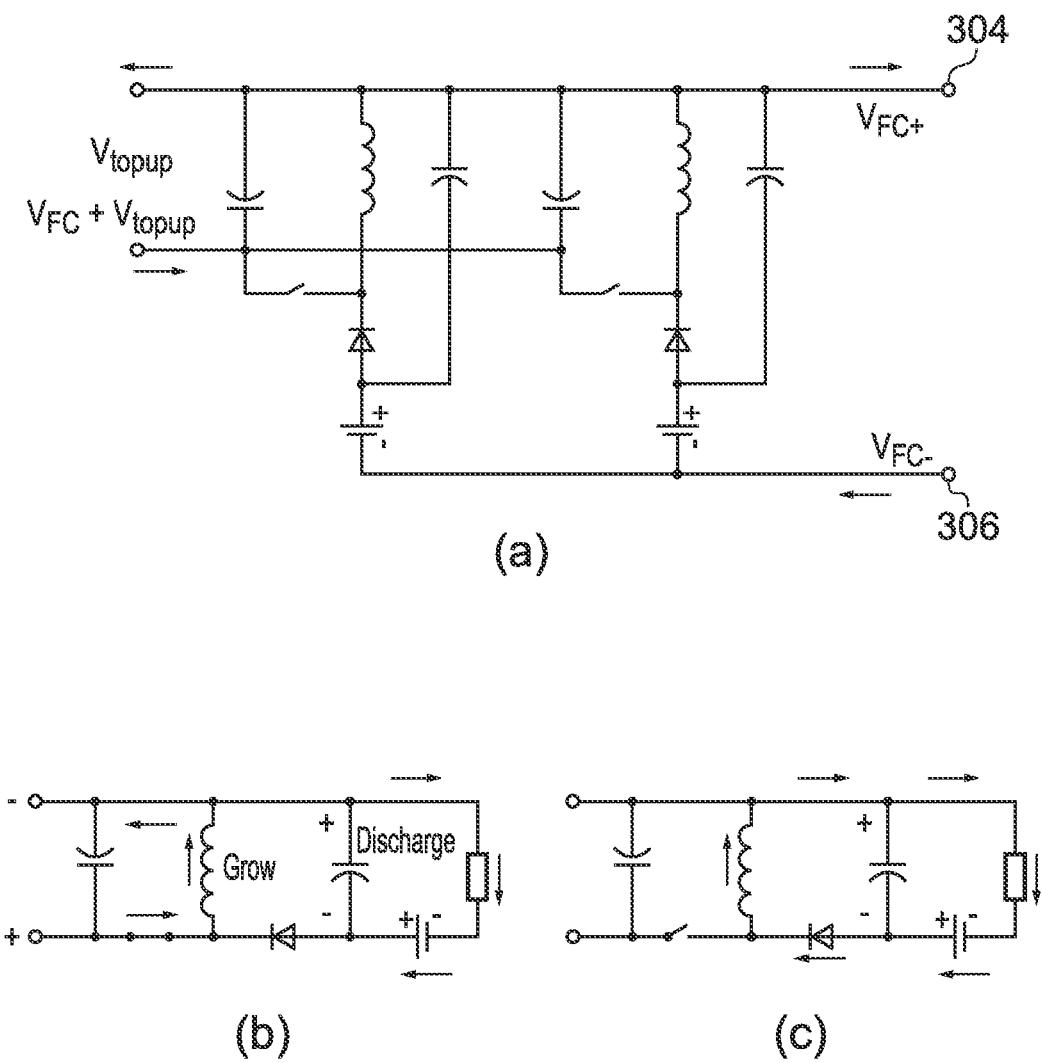
FIGS. 8(a), (b) and (c) are a diagram of a fuel cell unit with an inverting converter, and a simplified view of the current flow therein for the switch closed and switch open state respectively.

FIG. 8(a) shows a representation of a regulating DC-DC converter for use in a fuel cell unit in a negative common rail arrangement. An inverting DC-DC converter is illustrated. As the top-up voltage floats above the positive load rail, it would need to be generated by a flyback intermediate converter or other converter configuration that inverts off the positive rail. FIGS. 8(b) and (c) illustrate the current flows in the main circuit diagram of FIG. 8(a). In FIG. 8(b), the current flow for the closed switch state of the converter is shown, such that current flows through the inductor, and the stored charge in the capacitor supplies the load. In FIG. 8(c), the switch is open and the current is supplied by the inductor to the load and to charge the capacitor.

Figure 9:
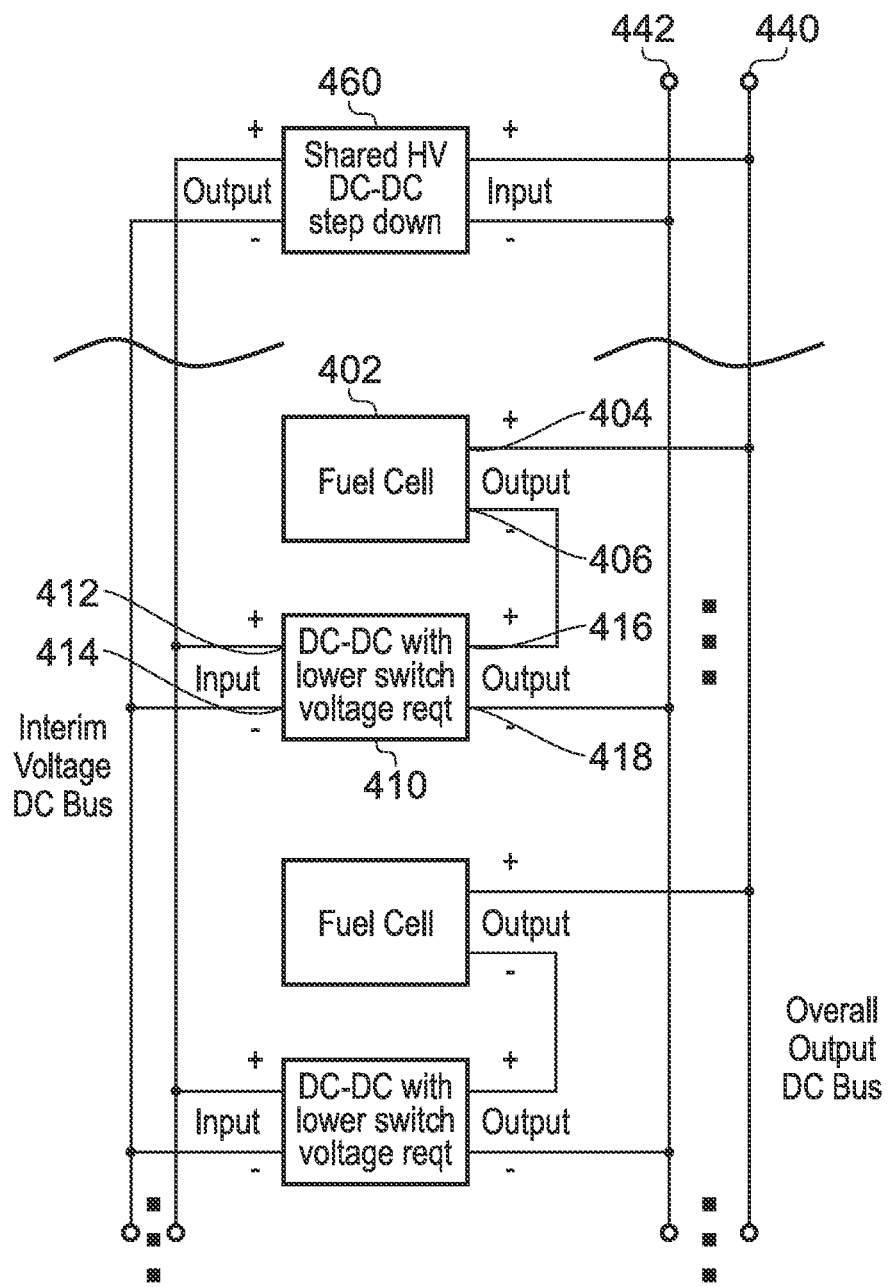
FIG. 9 is a block diagram of a fuel cell module having a shared DC-DC step down intermediate converter.

FIG. 9 shows another embodiment of fuel cell module having a shared DC-DC high voltage step down intermediate converter 460, to provide an interim voltage for conversion by the regulating DC-DC converters. The position of the fuel cell unit relative to the regulating DC-DC converter and the loads rails has been interchanged, compared to FIG. 8. This arrangement is referred to as a positive common rail arrangement, as the plurality of fuel cell are arranged such that the a positive fuel cell output terminals are connected the positive rail 440 and the plurality of regulating DC-DC converters are arranged to share a negative common rail 442. The fuel cell units of the fuel cell module of FIG. 9 substantially correspond to that shown in FIG. 4, except that the regulating DC-DC converters are driven by the interim voltage provided by the step-down intermediate converter, instead of being driven directly.

When the fuel cell units share a common positive rail, manufacturing costs of the system are reduced because of the improved availability of suitable converters having the appropriate voltage requirements.

Figure 10:
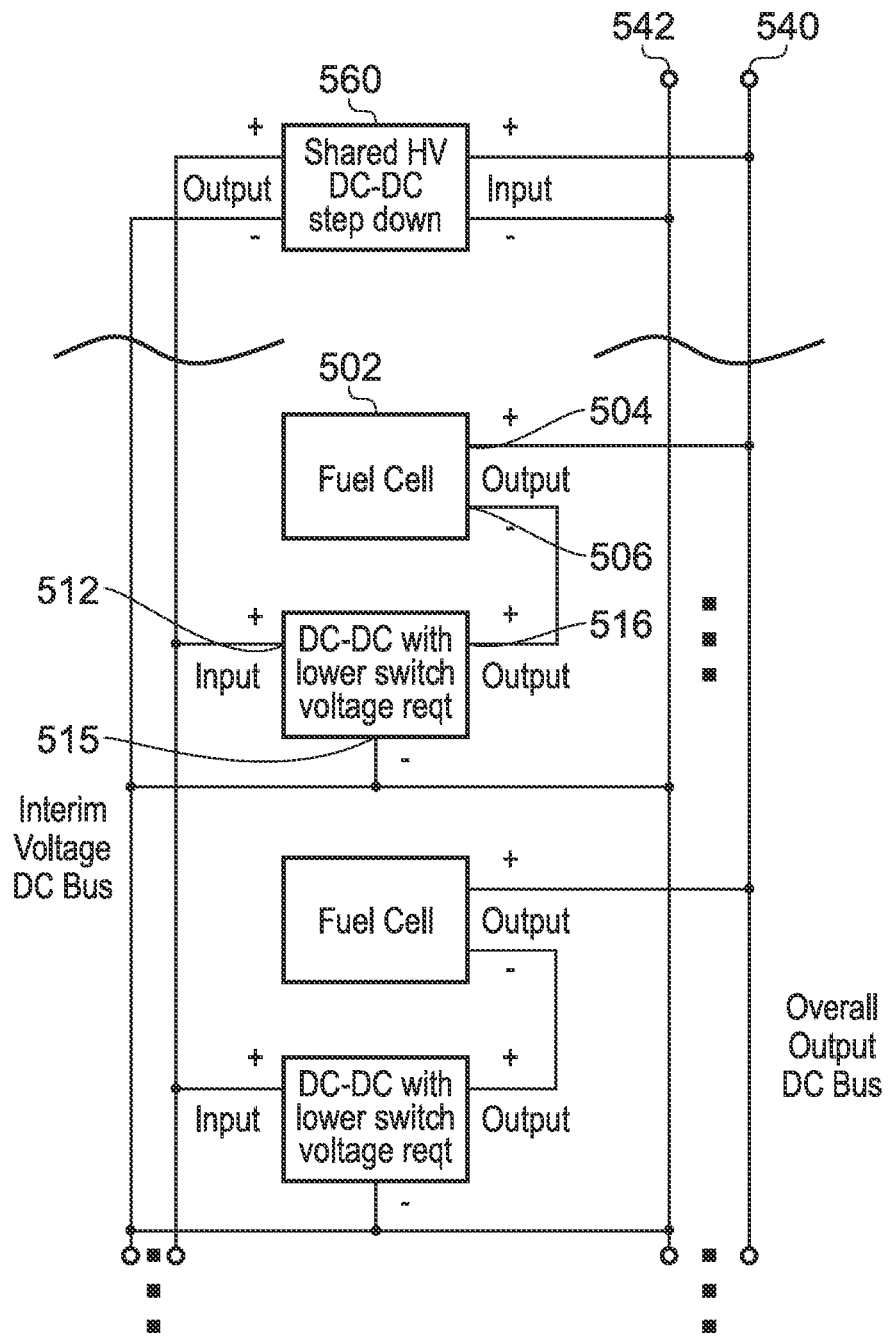
FIG. 10 is a block diagram of a fuel cell module having a shared DC-DC step down intermediate converter.

FIG. 10 shows another embodiment of fuel cell module having a shared DC-DC high voltage step down intermediate converter 560 and a positive common rail arrangement.

The shared DC-DC high voltage step down intermediate converter 560 negative output is tied to the negative load rail 542 allowing the individual regulating DC-DC converters 510 in the fuel cell units to be non-isolating converters. As such, inexpensive buck converters may be used. The lower voltage of the shared interim voltage DC bus enables the individual regulating DC-DC converters 510 to be inexpensive, highly integrated units.

In certain embodiments, both the shared DC-DC high voltage step down intermediate converter 560 and the individual regulating DC-DC converters 510 may be implemented using a non-isolating configuration using the shared interim voltage DC bus.

Figure 11:
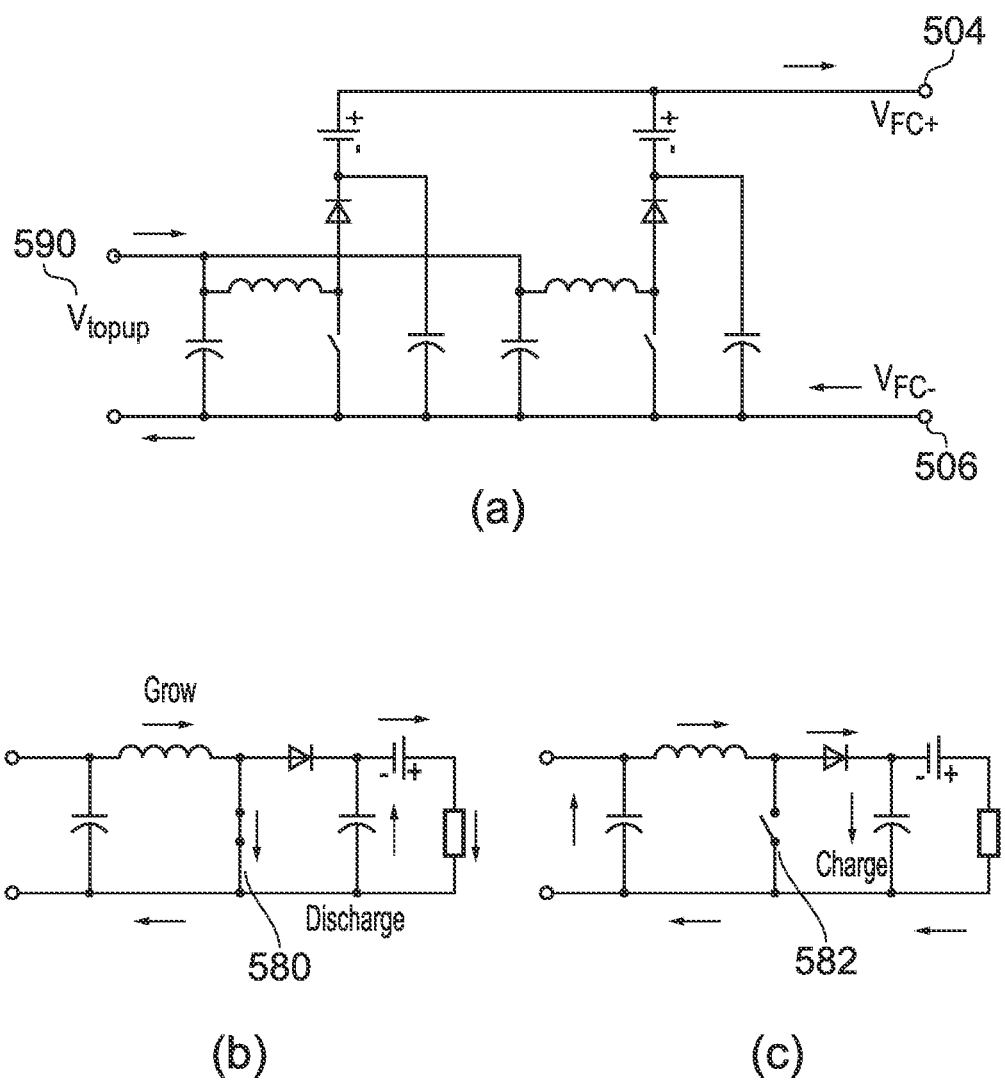
FIGS. 11(a), (b) and (c) are a diagram of a fuel cell unit with a boost converter, and a simplified view of the current flow therein for the switch closed and switch open state respectively.
Figure 12:
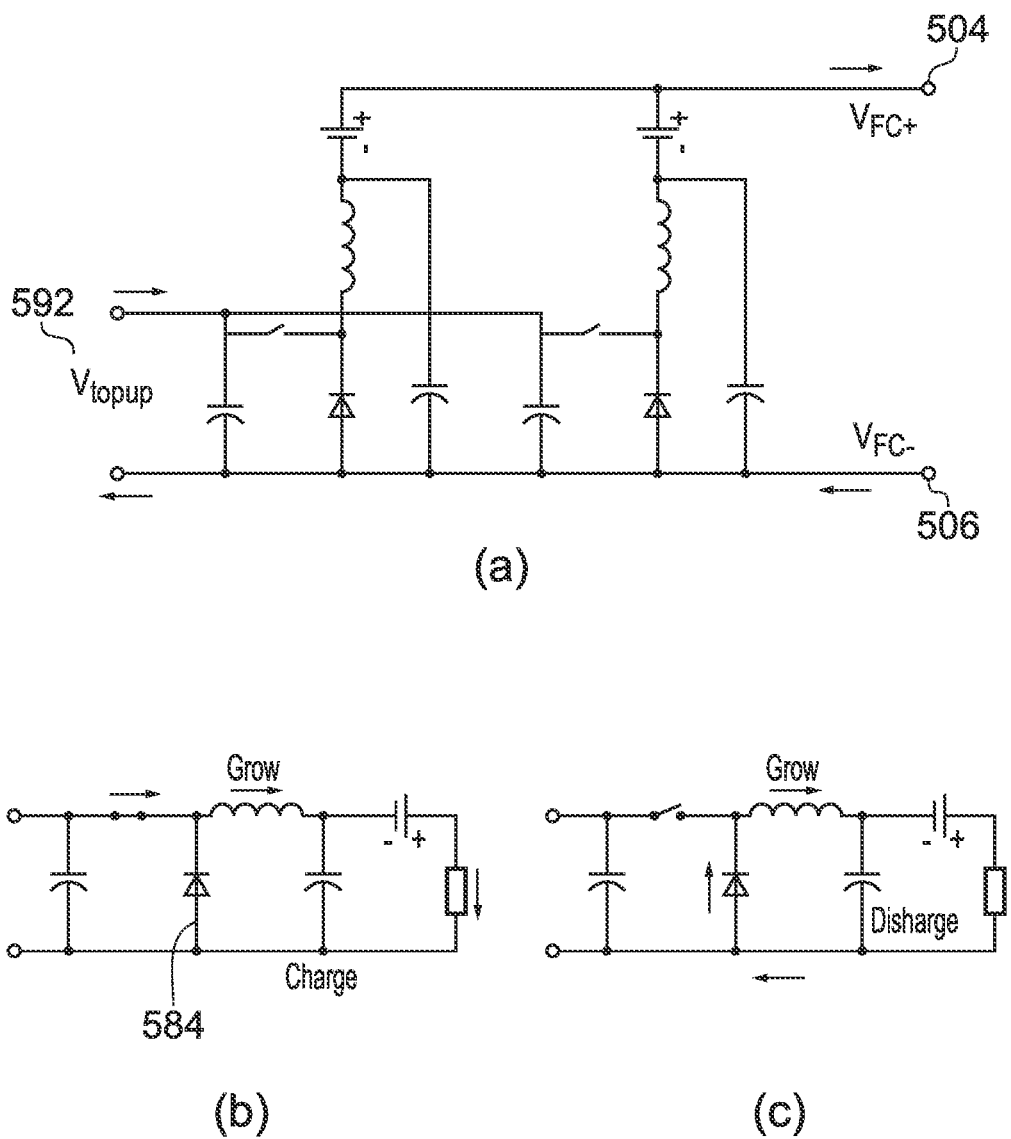
FIGS. 12(a), (b) and (c) are a diagram of a fuel cell unit with a buck converter, and a simplified view of the current flow therein for the switch closed and switch open state respectively.

FIGS. 11 and 12 show representations of the embodiment shown in FIG. 10.

FIG. 11(a) shows a representation of a regulating DC-DC converter for use in a fuel cell unit in a positive common rail arrangement. A boost converter is illustrated.

The output voltage of the boost converter will be larger than the voltage provided by $V_{topup}$ supply 590 and consequently, $V_{topup}$ supply 590 provides a baseline degree of correction to offset the degradation of a fuel cell unit. FIGS. 11(b) and (c) illustrate the current flows in the main circuit diagram of FIG. 11(a). In FIG. 11(b), the current flow for the closed switch state of the converter is shown, such that current flows through the inductor and the closed switch and does not reach the load, while the stored charge in the capacitor supplies the load. In FIG. 11(b), the switch is open and the current flows to the load and to charge the capacitor.

This configuration as shown in FIG. 11, has two modes of immunity to regulating DC-DC converter failure. Firstly, the fuel cell units may be loaded through a DC path through the diode alone if the switch 580 remains closed due to failure at the gate drive or further upstream in the controller. Secondly, in an alternative manner the fuel cells may be loaded through the $V_{topup}$ supply 590 if the switch 582 fails open. The diode of the boost converter provides basic diode protection functionality through the $V_{topup}$ supply 590.

FIG. 12(a) shows another representation of a regulating DC-DC converter for use in a fuel cell unit in a positive common rail arrangement. A buck converter is illustrated.

The output voltage of the buck converters cannot exceed the voltage provided by the $V_{topup}$ supply 592. FIGS. 12(b) and (c) illustrate the current flows in the main circuit diagram above. In FIG. 12(a), the current flow for the closed switch state of the converter is shown, such that current flows through the closed switch and the inductor to the load. In FIG. 12(c), the switch is open and the current flows from the capacitor to the load.

The use of the buck converter also offers a degree of immunity to fuel cell unit from failure in the DC-DC converter or converter controller. The fuel cell units may be loaded through a DC path through an inductor and a diode if a switch remains open due to failure at the gate drive or further upstream. The buck diodes also provide basic diode protection functionality to the arrangement.

Figure 13:
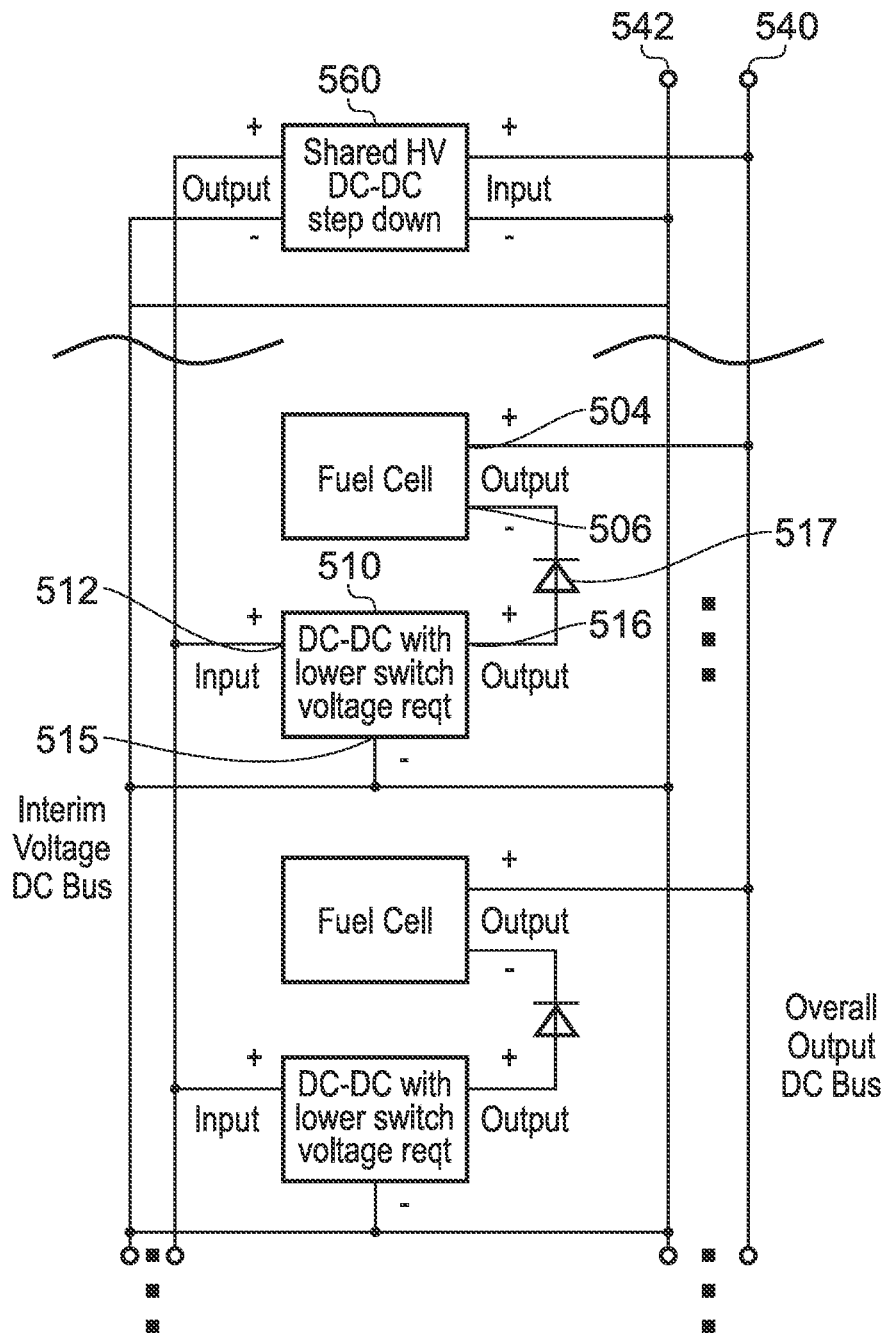
FIG. 13 is a block diagram of a fuel cell module having a shared DC-DC step down intermediate converter.
Figure 14:
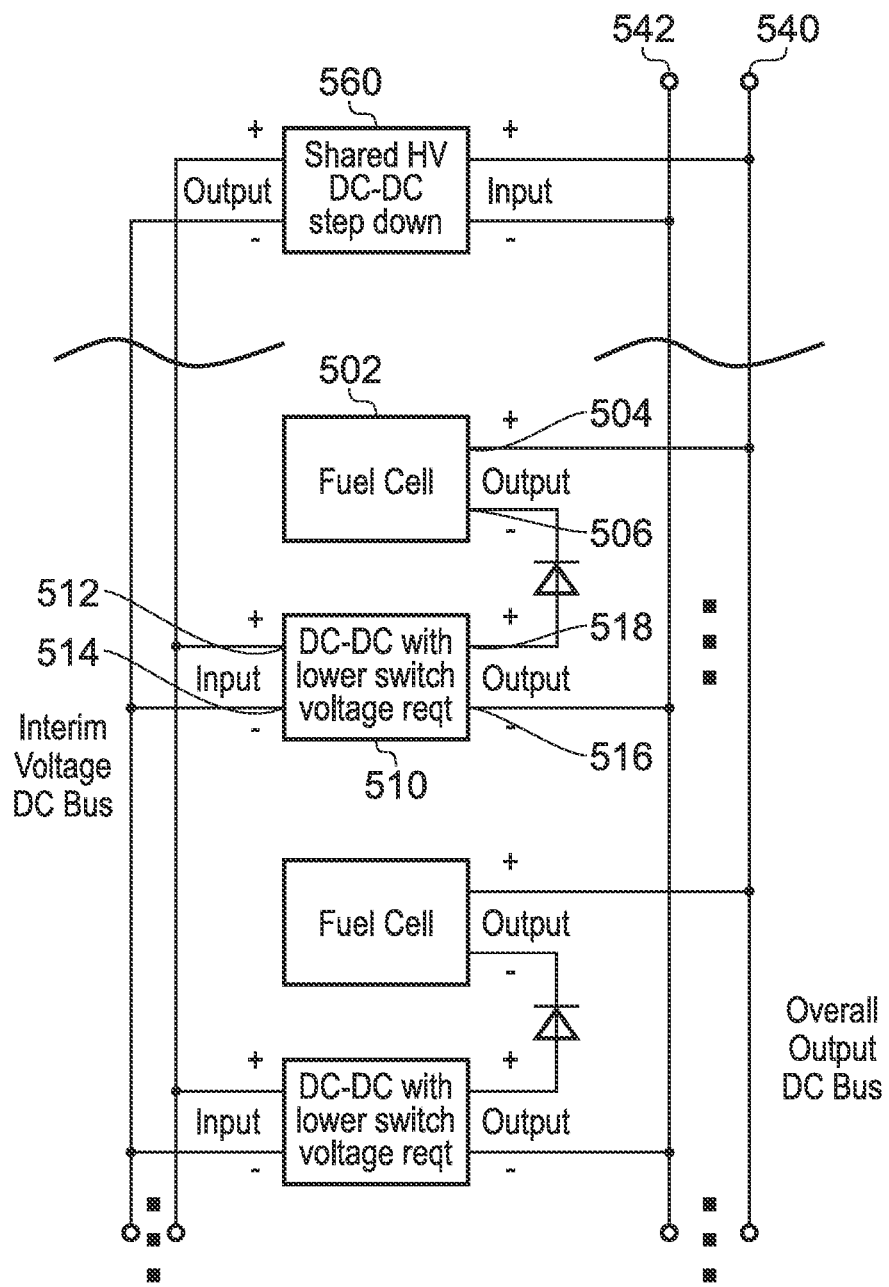
FIG. 14 is a block diagram of a fuel cell module having a shared DC-DC step down intermediate converter showing the diode circuit with instrumentation and additional diodes positioned to assist with accommodating failures of the converters.

FIG. 13 and FIG. 14 show positive common rail fuels cell modules, provided with means to measure the fuel cell unit current. A diode is placed in the path between the positive output terminal 516 of the regulating DC-DC converter 510 and the negative fuel cell output terminal 506 allows measurement of the Open Circuit Voltage (OCV) between fuel cell units using low voltage components both in normal operation and in certain failure cases. Additionally, including a shunt resistor in the DC-DC converter at the shared negative terminal of the regulating DC-DC converted 515 in FIG. 13 or the convert negative output terminal 516 in FIG. 14 allows low cost current measurement, as the fuel cell current is equal to the output current of the DC-DC regulating converter. Typically such shunt resistors would be available in integrated converter packages.

The individual regulating DC-DC converters 510 may be implemented in a flyback converter configuration 510 whereby the secondary voltage is intermittently visible on the primary side of the transformer, however it will be understood that other switched mode converters may be used.

The embodiments of fuel cell module shown in FIGS. 7, 9, 10, 13 and 14 can be referred to as two-stage regulating arrangements, where the first stage is the intermediate converter providing the interim lower voltage bus for driving the regulating DC-DC converters, which form the second stage. Typically, the intermediate converter would be on the cold side on the fuel cell, while the regulating DC-DC converters would be on the hot side.

Figure 17:
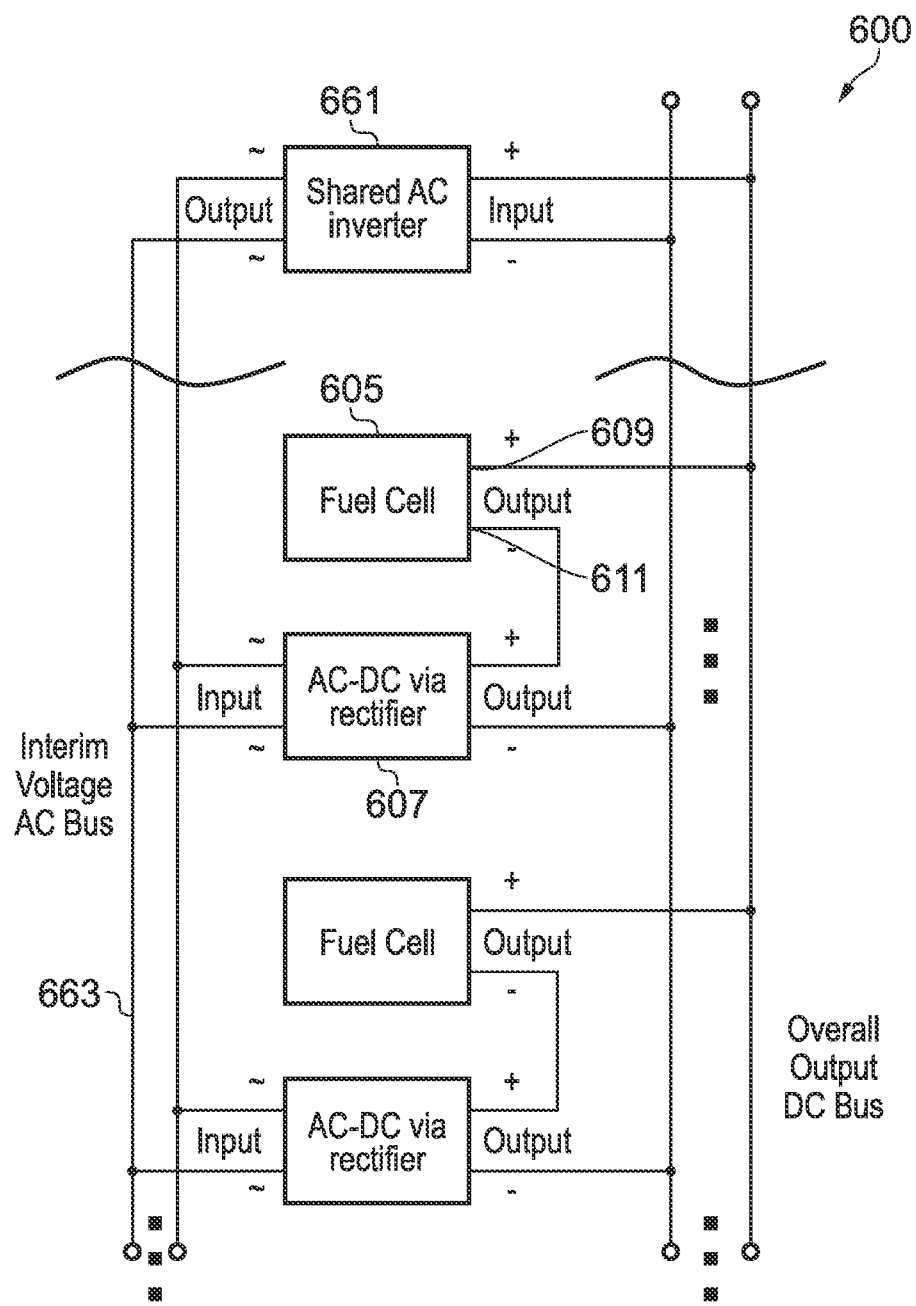
FIG. 17 is a block diagram of a fuel cell module having a shared AC inverter and AC-DC voltage converters.
Figure 18:
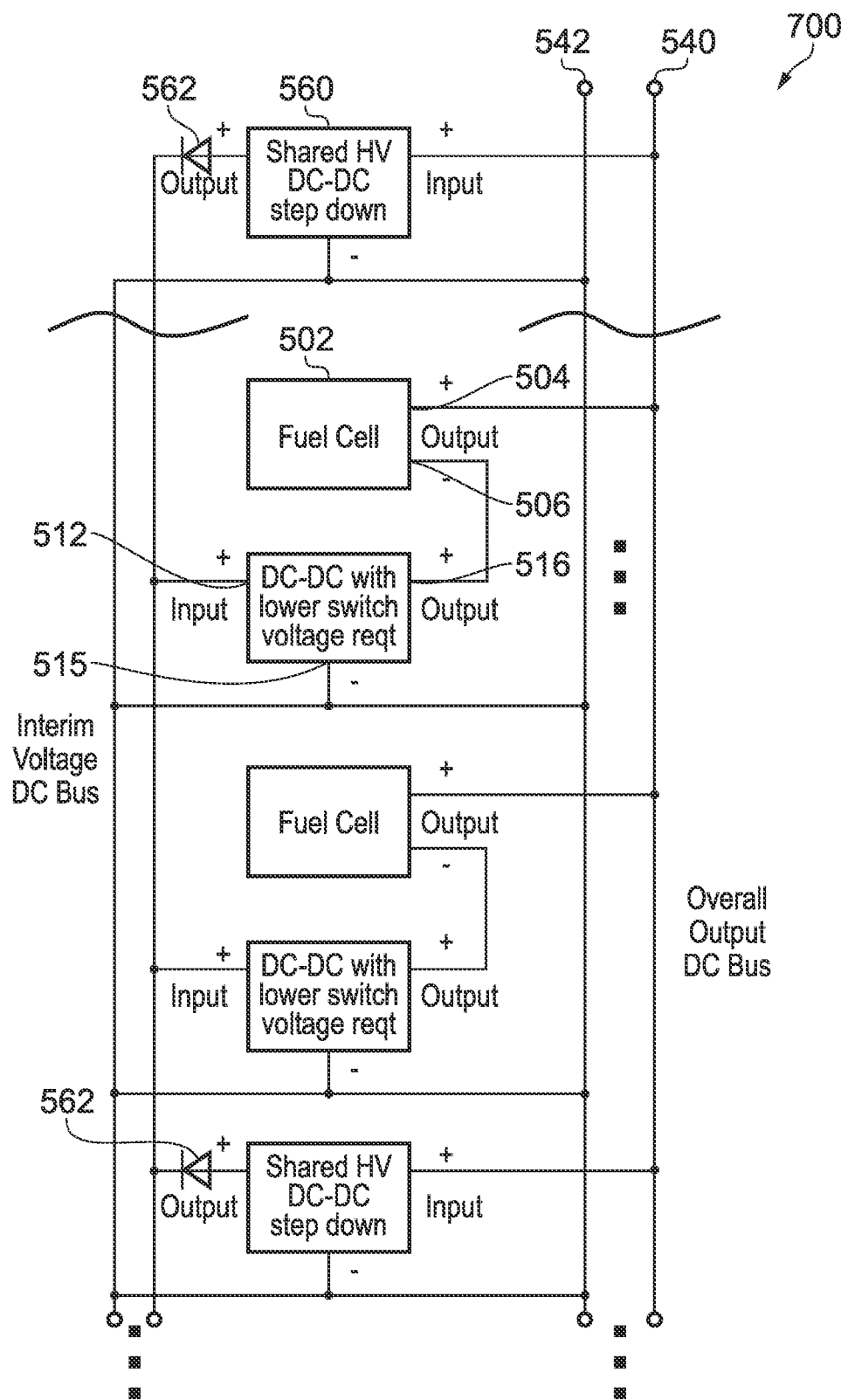
FIG. 18 is a block diagram of a fuel cell module including diodes arranged on the outputs of the shared converters.

Referring now to FIG. 17, there is shown an alternative embodiment of fuel cell module, indicated generally by the reference numeral 600. The arrangement shown in FIG. 18 is similar to that shown in FIG. 7, except that in this case, the interim voltage is an AC voltage. The AC fuel cell module 600 comprises a shared AC inverter 661 having a positive input connected to the positive load rail, and a negative input connected to the negative load rail. The output of the shared AC inverter 661 is an AC voltage bus 663 at a voltage level suitable for driving a plurality of AC-DC regulating voltage converters 607. The AC-DC regulating voltage converters 607 form part of the fuel cell units that make up the AC fuel cell module 600. The AC-DC regulating voltage converters 607 may be implemented in a variety of ways, for example using active or passive rectifiers connected directly or through transformers, which may be isolating or non-isolating. The AC-DC regulating voltage converters 607 may then be controlled to supply a DC voltage in a similar manner as the DC-DC regulating voltage converters discussed herein.

The AC interim voltage may be derived directly from the fuel cell output voltage in series with the converter output voltage by the shared AC inverter 661, as is shown in FIG. 18. The interim AC voltage may also be derived indirectly from the fuel cell output voltage in series with the converter output voltage. The AC interim voltage may be derived, for example, from the AC output of a Grid Connect Inverter of the fuel cell system of which the fuel cell module 600 forms a part; a dedicated lower voltage or higher frequency inverter unit; or an AC-AC converter such as a cycloconverter fed by the main GC inverter or the grid.

Referring now to FIG. 18, there is shown an alternative embodiment of the fuel cell module, indicated generally by the reference numeral 700. This fuel cell module 700 is similar to that shown in FIG. 7, however it comprises a plurality of step down intermediate converters 560, each having a positive output terminal and a negative output terminal. The positive output terminal of each step down intermediate converter 560 is connected to a diode such that the output of the diodes provide the interim voltage. A benefit of this arrangement is that additional robustness is provided. Should one step down intermediate converter 560 fail, the remaining step down intermediate converters 560 will still be available to supply the interim voltage bus.

Embodiments of the invention may be used to control the output current of a fuel cell unit, so as to provide optimum fuel utilisation. If fuel cell utilisation is too high, physical damage can be caused to the fuel cells, but if it is too low, the efficiency of the fuel cell element drops. It is expensive to accurately manage and control the flow of fuel within a large aggregated fuel cell element, therefore the flow of fuel is typically controlled at a high level for the overall aggregated assembly. However, it is possible to accurately model the fuel flow through the fuel cell elements such that the fuel flow to a fuel cell element within the larger aggregated fuel cell element may be estimated. Therefore, embodiments of the invention allow the output current for a fuel cell unit to be controlled to match the estimated fuel flow. The output current of the fuel cell unit is controlled, in an open loop manner, by operating the regulating DC-DC converter to control its output voltage. The regulating DC-DC converter operates in the standard manner, with a controller (not shown) operating to adjust the output voltages, based on the desired output current of the fuel cell unit. In this way, fuel utilisation may be optimised.

Typically, the fuel will be fed into a fuel cell module comprising a number of fuel cell units connected in parallel. In such an arrangement, it would be expected that the Open Circuit Voltages for each fuel cell unit would be largely equal, but some minor differences, for example due to manufacturing differences, would be present. Additionally, the Area Specific Resistances (ASR) could vary significantly between fuel cells. Therefore, as the fuel cell module goes on load, the differences in resistance will result in differences in current between fuel cell units within the same fuel cell module. Embodiments of the method of the invention allow the output currents of the various fuel cell units within the fuel cell module to be controlled as necessary.

It will be understood that embodiments of the invention will also work where the fuel flow is in fact measured, for example through analysis of compositional changes in the anode.

In an example, the current distribution across the fuel cell module is optimised against temperature distribution across the fuel cell module. The temperature of fuel cell units positioned at the front of the fuel cell module, close to the fuel inlet and oxidant inlet, typically operate at a lower temperature than the fuel cell units at the back of the fuel cell module, whereas the fuel cell units towards the back of the fuel cell module typically operate at a higher temperature than the fuel cell units at the front of the fuel cell module. Temperature distributions throughout the fuel cell module can reduce efficiency and lifespan of the fuel cells and therefore managing temperature distributions is advantageous.

By controlling the current distribution, the temperature distribution can be optimised. For example, controlling the regulating voltage converters to allow drawing a larger current from the fuel cell units at the front of the fuel cell module that typically run cooler increases the temperature in those the fuel cell units. This is advantageous because the temperature of fuel cell units positioned at the front of the fuel cell module, close to the fuel inlet and oxidant inlet, typically operate at a lower temperature than the fuel cell units located close to the back of the fuel cell module. Similarly, controlling the regulating voltage converters to allow drawing less current across the fuel cell units at the back of the fuel cell module decreases the temperature in those fuel cell units. The current can be optimised so that more current is drawn from the front of the fuel cell module, up to limits imposed by fuel cell durability.

Temperature variation across a fuel cell module or unit can have negative consequences for fuel cell lifespan while also having positive effects such as improving fuel cell efficiency. The power output can be maximised by controlling the current distribution in relation to the temperature distribution and the fuel cell module lifespan may be improved by moving current forward to reduce the temperature distribution in the fuel cell module.

In some fuel cell modules, fuel cell lifespan is partly limited by temperature driven mechanisms such as anode volatility. The anode volatility limit is a function of fuel composition, current density, and fuel cell temperature. The current distribution may be optimised so that the operating conditions of the fuel cell module are set so that the fuel cells are operated at a current density close to a limiting level of anode volatility.

By operating the fuel cell module close to the anode volatility, the power output of the fuel cell can be increased.

The voltage regulator converters may be controlled to allow each fuel cell unit in the fuel cell module to be optimised so that each fuel cell unit is operated at a maximum current density close to a limiting level of anode volatility of each fuel cell unit, which is related to the temperature of each fuel cell unit.

A similar approach can be implemented in the fuel cell module where the operating limit is driven by low temperature condition as in some cathode degradation mechanisms and therefore the current distribution is optimised to operate close to a limiting level of cathode volatility.

In a simulation of a specific example comprising a fuel cell module comprising five fuel cell units, each fuel cell unit comprising three pairs of fuel cell tubes and each fuel cell tube comprising plurality of fuel cells, the current distribution was varied in a generally linear manner from approximately 1.8 amps across the first fuel cell unit at the front of the fuel cell module to approximately 1.2 amps across the fifth fuel cell unit at the back of the fuel cell module. The example was compared directly to the same fuel cell module, wherein the current distribution was substantially constant across all of the fuel cell units. As a result of current distribution optimisation, each fuel cell unit is operated close to the anode volatility limit of each fuel cell unit (which is different for each fuel cell unit because the anode volatility limit is a function of fuel cell unit temperature which is different in each fuel cell unit). The output power from the fuel cell module increases by around 21%.

Most surprisingly, the power output can be increased by optimizing the current distribution without affecting the overall efficiency of the system. In both examples, the overall fuel cell efficient was substantially the same at around 60%. This is because optimising the current distribution results in changes in the temperature profile in the fuel cell module and therefore a greater proportion of the fuel cells are operating at a more efficient temperature and therefore the power output is increased. Furthermore, the fuel cell module retains substantially similar durability parameters.

In another example, the fuel cell module can be operated with more complex current distribution functions. The current distribution can be optimised via a penalty function reflecting customer economics such as levelized energy cost or Cost of Electricity (CoE).

The current distribution can be optimised by a CoE function including terms reflecting capital cost, fuel cost and maintenance cost. Capital cost is weighted by financing cost and driven by the reciprocal of the fuel cell module power output. The fuel cost term is driven by raw fuel cost and the reciprocal of the fuel cell module efficiency. The maintenance term is dominated by replacement cost of fuel cell module and is also closely associated with short life components. This term is a sensitive function of degradation rate which in turn is driven by current density and local current in the fuel cells.

The fuel cell module can be driven by optimising the current distribution to a worst case degradation limit so that all fuel cell units in the fuel cell module fail at the same time. The benefit of operating the fuel cell module in this manner, is that the maximum durability of all of the fuel cell units is utilised rather than having power or efficiency of the fuel cell module being limited by the failure of a single point in the fuel cell module which invariable leads to the rest of the fuel cell module being underused.

Figure 15:
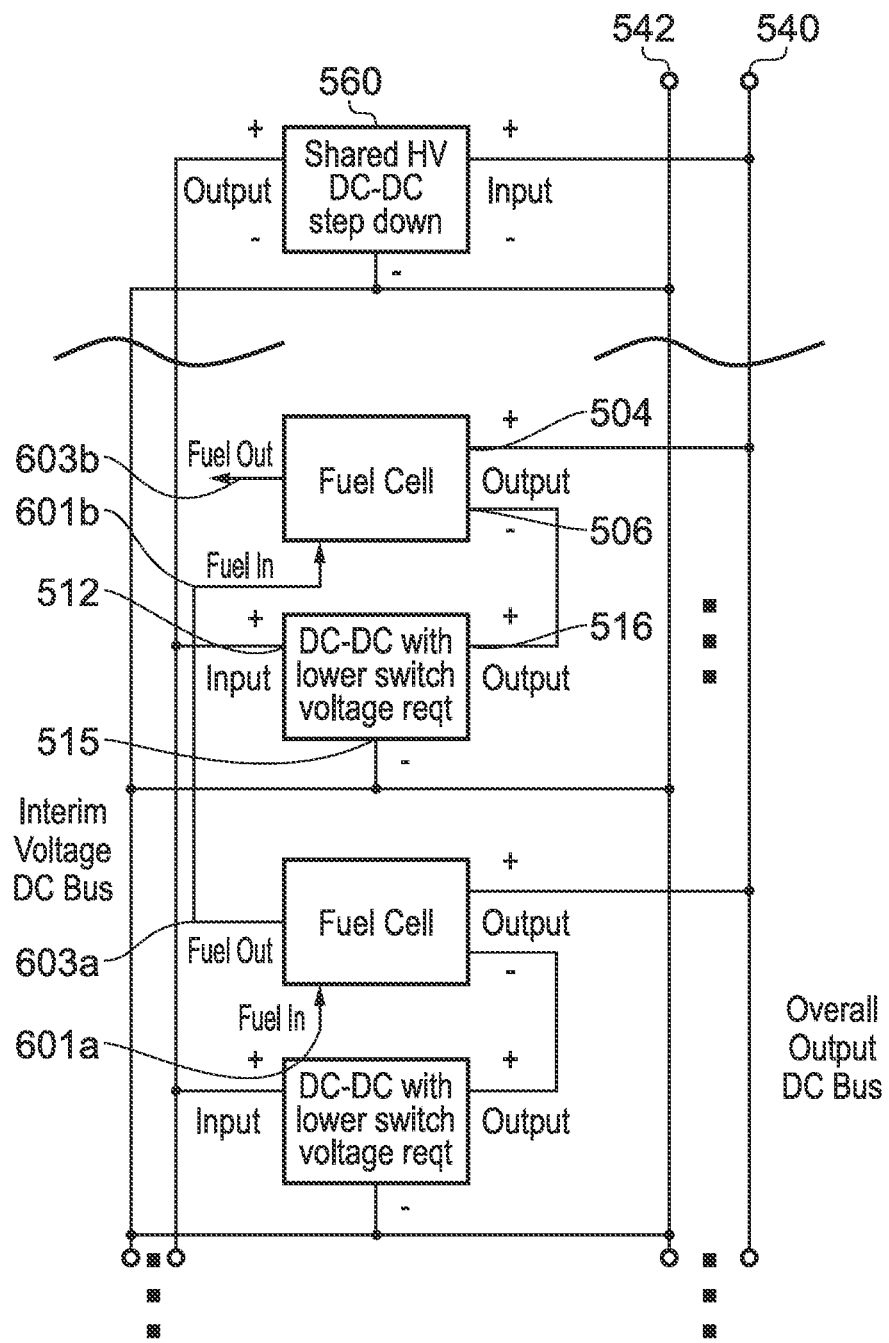
FIG. 15 is a block diagram of a fuel cell module having a shared DC-DC step down intermediate converter, wherein the converter is used to optimise current distribution to suit fuel condition.
Figure 16:
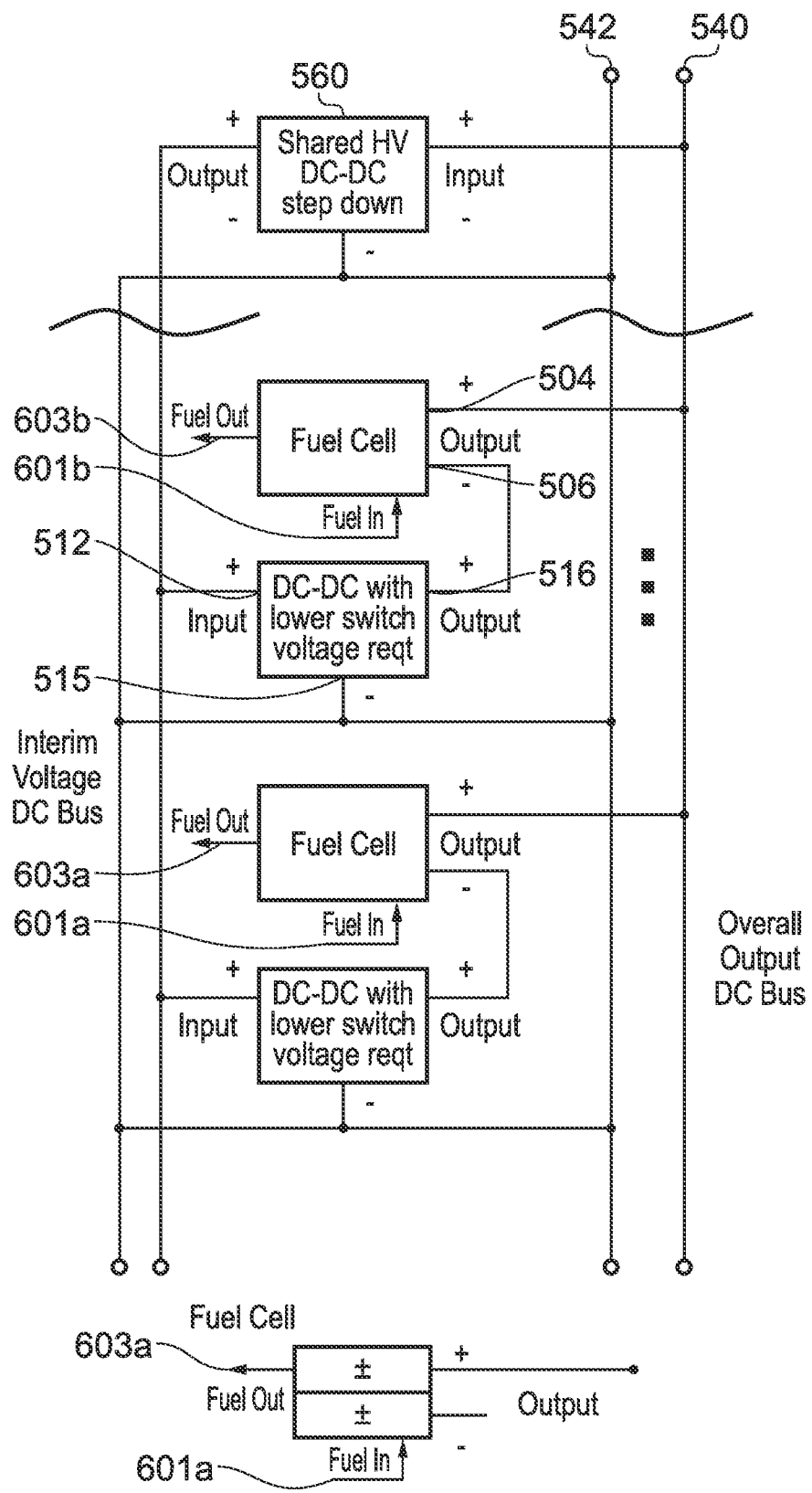
FIG. 16 is a block diagram of a fuel cell module having a shared DC-DC step down intermediate converter and the fuel cell module comprises a number of fuel cell units electrically connected in series which corresponds to the fuel flow path.

The current distribution can also be optimised to complement the fuel condition i.e. molar flow of remaining flammables in the fuel (i.e. molar flow of unoxidised flammable gases), which is preferable in certain fuel cell modules wherein the fuel condition varies from one fuel cell to the next fuel cell or when the fuel condition varies within the fuel cell unit as shown in FIGS. 15 and 16. The fuel cell module shown in FIGS. 15 and 16 correspond to that shown previously in FIG. 10, having the fuel path illustrated. In FIG. 15, the fuel is fed in series to the fuel cells, such that fuel is fed into the lower fuel cell at 601a, exits the lower fuel cell at 603b and then proceeds to enter the next fuel cell (the upper fuel cell in the figure) at 601b and exits that fuel cell at 603b. As the flow of fuel is arranged in series, the fuel condition varies between fuel cells. The current distribution is then optimised to complement the fuel condition at each fuel cell unit.

In FIG. 16, an alternative fuel flow arrangement is shown, where the fuel cells are fed in parallel. In this way, fuel is fed in at 601a and 601b and exits at 603a and 603b, but the fuel exiting the lower fuel cell at 603a is not fed into the upper fuel cell at 601b. In this way the fuel condition is determined at the fuel cell unit level and the current distribution is optimised to complement the fuel condition.

The arrangements described herein provide a fuel cell unit with the ability to balance current against fuel flow, and so improve efficiency. Balancing the currents corresponds to matching the currents to the fuel distribution profile of the fuel cell unit or deliberately choosing to depart from this profile in a controlled way so that the trade-off between fuel cell unit life and efficiency is optimised for the benefit of achieving lowest cost of electricity. The regulating voltage converters are controlled so that a current across each of the fuel cell units can be set at a desired value. Regulating the flow of fuel in each fuel cell using valves is very difficult especially for large fuel cell elements having large outputs, so the ability to regulate the current of each fuel cell unit is advantageous. Furthermore, fuel regulation is even more difficult where the fuel is partially recirculated to avoid water use. A fuel cell unit of the types described herein may be particularly useful in a fuel cell power supply system (e.g. a fuel cell module), and may also be useful with other applications of fuel cell.

Furthermore, by arranging the regulating voltage converters such that they are driven by the output voltage of the fuel cell in series with the converter output voltage, each regulating voltage converter need only be rated to a low voltage, and not the total output voltage, since each regulating voltage converter is only required to vary the output voltage of the fuel cell combined with the regulating voltage converter, by a small amount, typically in the range of about 6 to 36 volts but with future lower resistance fuel cell element technologies this might be as low as 3V. Conversely for series cell connected designs with very small cell pitch this might be as much as 100V.

Additionally, by arranging the regulating voltage converters such that they are driven by the output voltage of the fuel cell in series with the converter output voltage, the losses associated with the voltage converter are only applied to the power handled by the regulating voltage converter, not the total output power. This reduction in power requirement allows the use of advanced components such as small integrated DC-DC converters in building fuel cell units. These devices may be designed to operate at very high frequency thus providing other benefits including further reduction in volume and cost savings and reduced interaction with the electrochemistry of the fuel cell. The high frequencies used by the components of such small integrated converters also lie outside of the range of AC impedance response exhibited by the fuel cell which rolls off at low hundreds of kHz.

Integrating electronics into the fuel cell contributes to improving the interfaceability of the fuel cells and may assist in enabling direct connection to lower cost grid connection inverters. The present invention effectively hides many of the characteristics of the fuel cell system from the inverter and it is therefore possible to use standard inverters. Such inverters can have efficiencies of 98% and above.

There are additional benefits in terms of isolating the fuel cell units from the power electronics used to connect to the grid. Typically, an inverter used to connect the fuel cell power supply system to the grid operates at around 3 kHz and has corresponding switching harmonics in the region of about 10 to 20 kHz. In certain circumstances, for example, when a grid connected inverter (GCI) is connected to a local distribution network with unevenly loaded phases, a ripple current at twice mains frequency namely 100 or 120 Hz may occur. The AC impedance response of a fuel cell is not typically constant, and impedance effects exist which may be at the timescale of certain processes and occur in the low frequency range at around the frequency of the ripple and at the higher frequency range around the frequency of the harmonics. Specifically the 100-120 Hz frequency is known to correspond to chemical processes within cathodes of SOFCs (solid oxide fuel cells) constructed with widely used Lanthanum Strontium Manganite (LSM) based cathode materials. Therefore, isolating the fuel cell units from the power electronics by implementing regulating voltage converters can reduce the effects of the ripple and switching harmonics of the grid connection inverters. In arrangements using an intermediate step-down converter adapted to provide an interim voltage, the regulating voltage converters may use fully integrated devices, typically designed to deal with smaller voltages. Thus, having a step-down intermediate converter may be more cost effective as the individual fuel cell regulating voltage converters may be rated for lower voltages, and therefore lower cost off-the-shelf components may be used.

A shared step-down intermediate voltage converter also enables the use of fully integrated devices typically designed to deal with smaller voltages. Providing a step-down intermediate voltage converter provides a voltage drop for the fuel cell module such that each regulating voltage converter need only be rated to a smaller voltage such as 18V. The lower voltage rating of the regulating voltage converter results in a physically smaller regulating voltage converter typically having switching harmonics well out of range of the fuel cell response.

It will be clear to a person skilled in the art that features described in relation to any of the embodiments described above can be applicable interchangeably between the different embodiments. The embodiments described above are examples to illustrate various features of the invention Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A fuel cell unit configured to connect to a positive load rail and a negative load rail, suitable for being one of a number of fuel cells connected in parallel to the positive load rail and the negative load rail, the fuel cell unit comprising a fuel cell, having a fuel cell output voltage presented between a positive fuel cell output terminal and a negative fuel cell output terminal, and a regulating voltage converter having a DC converter output voltage presented across a positive converter output terminal and a negative converter output terminal and an input configured to be driven;
    the regulating voltage converter being arranged so that the input is driven by the fuel cell output voltage in series with the converter output voltage; and
    the converter output voltage combines with the fuel cell output voltage such that the voltage across the fuel cell and the regulating voltage converter is the same as the voltage across the positive load rail and negative load rail.

2. The fuel cell unit as claimed in claim 1, wherein the positive fuel cell output terminal is configured to be connected to the positive load rail, and the negative output converter terminal is configured to be connected to the negative load rail.

3. The fuel cell unit as claimed in claim 2, wherein the regulating voltage converter is a DC-DC converter.

4. The fuel cell unit as claimed in claim 3, wherein the input comprises a positive converter input terminal and a negative converter input terminal; and the negative converter output terminal is further connected to the negative converter input terminal, the positive fuel cell output terminal is further connected to the positive converter input terminal, and the negative fuel cell output terminal is connected to the positive converter output terminal.

5. The fuel cell unit as claimed in claim 3, wherein the DC-DC converter is a flyback converter.

6. The fuel cell unit as claimed in claim 5, wherein the flyback converter is a hybrid rated flyback converter.

7. The fuel cell unit as claimed claim 6, wherein the hybrid flyback converter comprises a primary winding and a secondary winding, the primary winding being rated for one of fuel cell current or fuel cell voltage, the secondary winding being rated for fuel cell current.

8. The fuel cell unit as claimed in claim 2, wherein the regulating voltage converter is a DC-DC converter.

9. The fuel cell unit as claimed in claim 8, wherein the input comprises a positive converter input terminal and a negative converter input terminal; and the positive converter output terminal is further connected to the positive converter input terminal, the negative fuel cell output is further connected to the negative converter input terminal, and the positive fuel cell output terminal is connected to the negative converter output terminal.

10. The fuel cell unit as claimed in claim 8, wherein the DC-DC converter is a flyback converter.

11. A fuel cell module comprising a plurality of fuel cell units of claim 1, wherein the plurality of fuel cell units are connected in parallel across the positive load rail and the negative load rail.

12. The fuel cell module as claimed in claim 11, further comprising an intermediate converter configured to provide an interim voltage wherein the intermediate converter is driven by the voltage across the positive load rail and negative load rail, and the interim voltage drives each regulating voltage converter of the plurality of fuel cell units.

13. The fuel cell module as claimed in claim 12, wherein the intermediate converter is a step-down converter.

14. The fuel cell module as claimed in claim 12, wherein the fuel cell module comprises a plurality of intermediate converters, each having a positive output terminal and a negative output terminal wherein each positive output terminal is connected to a diode such that the output of the diode provides the interim voltage.

15. The fuel cell module as claimed in claim 11, wherein the intermediate converter in an AC inverter providing an AC interim voltage and each regulating voltage converters is an AC-DC converter.

16. The fuel cell module as claimed in claim 11, wherein the intermediate converter is driven indirectly by the voltage across the positive load rail and negative load rail.

17. The fuel cell unit as claimed in claim 1, wherein the negative fuel cell output terminal is configured to be connected to the negative load rail and the positive converter output terminal is configured to be connected to the positive load rail.

18. A fuel cell unit configured to connect to a first load rail and a second load rail, suitable for being one of a number of fuel cells connected in parallel to the positive load rail and the negative load rail, the fuel cell unit comprising a fuel cell, having a fuel cell output voltage presented between a first fuel cell output terminal and a second fuel cell output terminal, and a regulating voltage converter having a converter output voltage presented across a first converter output terminal and a second converter output terminal and an input configured to be driven comprising a first converter input terminal and a second converter input terminal; wherein the first load rail is configured to be connected to the second converter input terminal and the first converter output terminal, the second load rail is configured to be connected to the second fuel cell output terminal, the first converter input terminal is connected to the first fuel cell output terminal, and the second converter output terminal is configured to be connected to the second load rail.

\* \* \* \* \*